US009854582B2

United States Patent
Hamada

(10) Patent No.: US 9,854,582 B2
(45) Date of Patent: Dec. 26, 2017

(54) BASE STATION, WIRELESS COMMUNICATION SYSTEM, AND METHOD FOR CONTROLLING ALLOCATION OF WIRELESS RESOURCE

(71) Applicant: FUJITSU LIMITED, Kawasaki-shi, Kanagawa (JP)

(72) Inventor: Seiji Hamada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 342 days.

(21) Appl. No.: 14/528,391

(22) Filed: Oct. 30, 2014

(65) Prior Publication Data

US 2015/0139200 A1 May 21, 2015

(30) Foreign Application Priority Data

Nov. 21, 2013 (JP) ................................ 2013-240959

(51) Int. Cl.
*H04W 72/04* (2009.01)
*H04W 74/08* (2009.01)

(52) U.S. Cl.
CPC ....... *H04W 72/046* (2013.01); *H04W 74/085* (2013.01)

(58) Field of Classification Search
CPC ..... H04L 5/0053; H04L 5/001; H04L 5/0035; H04L 5/0023; H04L 5/0094; H04L 5/0007; H04L 5/0032; H04L 12/189; H04L 5/0073
See application file for complete search history.

(56) References Cited

U.S. PATENT DOCUMENTS

| 8,184,609 | B2 * | 5/2012 | Khan | H04B 1/713 370/319 |
| 8,804,630 | B2 * | 8/2014 | Ito | H04W 56/0045 370/329 |
| 9,402,253 | B2 * | 7/2016 | Yang | H04L 1/0076 |
| 2012/0026952 | A1 | 2/2012 | Okubo et al. | |
| 2012/0057535 | A1 | 3/2012 | Zhang et al. | |
| 2012/0147844 | A1 | 6/2012 | Kim et al. | |
| 2013/0258895 | A1 * | 10/2013 | Kim | H04J 11/0056 370/252 |

(Continued)

FOREIGN PATENT DOCUMENTS

| JP | 2010-183287 | 8/2010 |
| JP | 2011-205326 | 10/2011 |

(Continued)

OTHER PUBLICATIONS

JPOA — Japanese Office Action dated on May 23, 2017 for corresponding Japanese Application No. 2013-240959, with machine translation of the relevant part. **JP2010-183287 cited in the JPOA was previously submitted in the IDS filed on Oct. 30, 2014.

*Primary Examiner* — Sai Aung
(74) *Attorney, Agent, or Firm* — Fujitsu Patent Center

(57) ABSTRACT

A base station provides a first wireless area to communicate with a wireless terminal using a wireless resource. The base station includes a controller that, when controlling allocation of a first wireless resource to be used for data communication between the base station and the wireless terminal in the first wireless area, refers to allocation information representing allocation of a second wireless resource to be used for communication of a preamble of random access in a second wireless area.

14 Claims, 26 Drawing Sheets

(56) References Cited

U.S. PATENT DOCUMENTS

| | | | | |
|---|---|---|---|---|
| 2014/0016534 A1* | 1/2014 | Kim | ................ | H04W 74/0833 |
| | | | | 370/312 |
| 2014/0105158 A1* | 4/2014 | Kim | ................... | H04W 72/042 |
| | | | | 370/329 |
| 2014/0169323 A1* | 6/2014 | Park | ................ | H04W 72/1289 |
| | | | | 370/329 |
| 2014/0219204 A1* | 8/2014 | Park | .................... | H04L 1/1822 |
| | | | | 370/329 |

FOREIGN PATENT DOCUMENTS

| | | |
|---|---|---|
| JP | 2013-502810 | 1/2013 |
| JP | 2013-521714 | 6/2013 |
| WO | 2013/096616 A1 | 6/2013 |

* cited by examiner

FIG. 21

| PARTIAL BOUNDARY REGION ID | NEIGHBORING AREA ID |
|---|---|
| BBD#1 | WA#2, WA#3 |
| BBD#2 | WA#3 |
| BBD#3 | WA#3, WA#5 |
| BBD#4 | WA#5 |
| BBD#5 | WA#5, WA#9 |
| BBD#6 | WA#9 |
| BBD#7 | WA#2, WA#9 |
| BBD#8 | WA#2 |

BASE STATION, WIRELESS COMMUNICATION SYSTEM, AND METHOD FOR CONTROLLING ALLOCATION OF WIRELESS RESOURCE

CROSS-REFERENCE TO RELATED APPLICATION

This application is based upon and claims the benefit of priority of the prior Japanese Patent application No. 2013-240959, filed on Nov. 21, 2013, the entire contents of which are incorporated herein by reference.

FIELD

The embodiments discussed herein are a base station, a wireless communication system, and a method for controlling allocation of wireless resource.

BACKGROUND

A typical wireless communication system includes wireless terminals and base stations. In such a wireless communication system, each base station provides a wireless area where a wireless terminal communicates with the base station, using a wireless resource.

A wireless terminal positioned in a wireless area executes random access to establish communication with a base station. Random access includes a process to send a preamble to a base station from the wireless terminal, using a wireless resource allocated by the base station in advance.

A preamble is a signal having a prescribed pattern. The base station calculates a degree of correlation between a signal received through a wireless resource allocated to preamble communication and a replica signal that the base station retains in advance, and detects a preamble on the basis of the calculated degree of correlation. Upon detection of a preamble, the base station sends a response signal corresponding to the detected preamble.

An example of such a wireless communication system allocates different wireless resources to preamble communication in respective neighboring wireless areas (see Patent Literature 1 and Patent Literature 2).

Patent Literature 1: Japanese National Publication of International Patent Application No. 2013-502810

Patent Literature 2: Japanese Laid-Open Patent Publication No. 2010-183287

SUMMARY

According to an aspect of the embodiments, there is provided a base station that provides a first wireless area to communicate with a wireless terminal using a wireless resource, the base station including a controller that, when controlling allocation of a first wireless resource to be used for data communication between the base station and the wireless terminal in the first wireless area, refers to allocation information representing allocation of a second wireless resource to be used for communication of a preamble of random access in a second wireless area.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 21 is an example of a table that is stored in a base station of a fifth embodiment and that associates a partial boundary ID with a neighboring area ID;

DESCRIPTION OF EMBODIMENTS

Even when the wireless terminal sends a preamble via the wireless resource allocated to preamble communication in the corresponding wireless area, interference based on data sent in another wireless area may cause the base station to erroneously detect the preamble.

In this case, the base station sends an unnecessary response signal in response to the preamble erroneously detected, which has a possibility of lowering the throughput of the entire wireless communication system. Besides, the consumption electric power of the base station may increase.

Hereinafter, the embodiments will be described with reference to the accompanying drawings. The following embodiments are exemplary, so there is no intention to exclude application of various modifications and techniques not suggested in the following description to the embodiments. Throughout accompanying drawings of the embodiments, like reference numbers designate the same or substantially identical parts and elements.

First Embodiment

Overview

A wireless communication system according to a first embodiment includes a wireless terminal and a base station that provides a first wireless area to communicate with the wireless terminal using a wireless resource.

In controlling allocation of a wireless resource to be used for data communication with the wireless terminal in a first wireless area, the base station refers to allocation information representing allocation of a wireless resource for communication of a preamble of random access in a second wireless area. Here, the term "random access" may also be referred to as a random access sequence or a random access procedure. For example, a preamble may be generated by arranging multiple signatures into a certain pattern.

This can reduce the possibility that a base station that provides the second wireless area erroneously detects the preamble of random access that has been sent in the second wireless area, the erroneous detection being caused by the preamble being interfered with data that has been sent in the first wireless area.

Hereinafter, the wireless communication system according to a first embodiment will now be detailed.

(Configuration)

Figure 1:
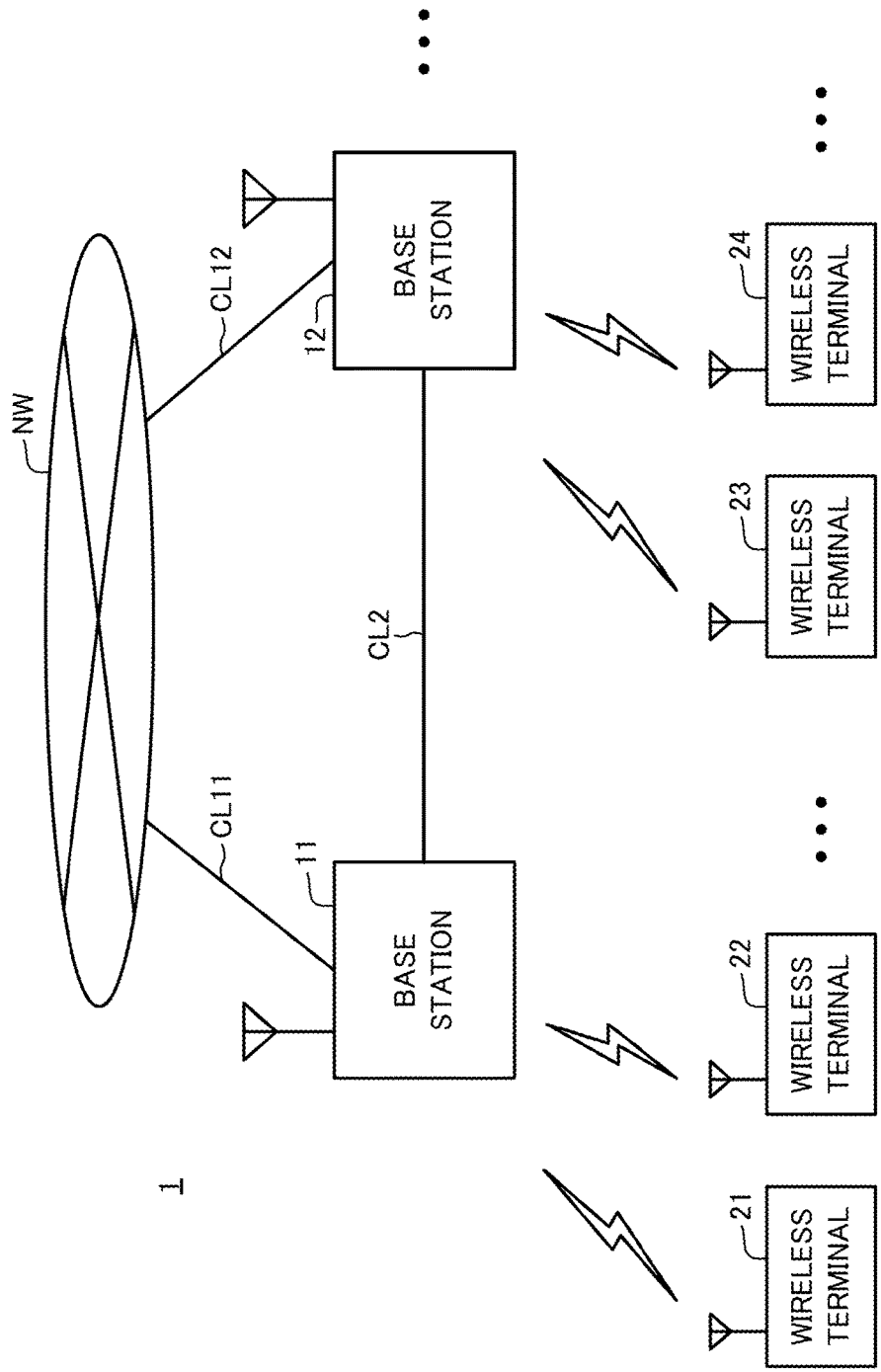
FIG. 1 is a block diagram schematically illustrating an example of the configuration of a wireless communication system according to a first embodiment.

As illustrated in FIG. 1, a wireless communication system 1 of the first embodiment includes multiple base stations 11, 12, . . . and multiple wireless terminals 21, 22, 23, 24, . . . . Alternatively, the wireless communication system 1 may include a single base station.

The wireless communication system 1 carries out wireless communication between the base stations 11, 12, . . . and the wireless terminals 21, 22, . . . in accordance with a certain wireless communication scheme. An example of the wireless communication scheme is Long Term Evolution (LTE), LTE-advanced, or Worldwide Interoperability for Microwave Access (WiMAX).

The base stations 11, 12, . . . each provide at least one wireless area, which may be also referred to as a "coverage area" and a "communication region". For example, a wireless area corresponds to a cell such as a macrocell, a microcell, a nanocell, a picocell, a femtocell, a home cell, or a sector cell. The base stations 11, 12, . . . each wirelessly communicate with wireless terminals 21, 22, . . . located in a local wireless area that the base stations 11, 12, . . . provide.

For example, the base stations 11, 12, . . . each provide a wireless resource (in this example, a resource specified in terms of time and frequency) in the local wireless area that the base station provides. The base stations 11, 12, . . . communicate with the wireless terminals 21, 22, . . . positioned in the local wireless areas that the respective base stations provide using wireless resources provided in the respective local base stations. An example of the base stations 11 and 12 is an access point, an Evolved Node B (eNB), a Node B (NB), a femto base station, a macro base station, and a home base station.

In the first embodiment, the base stations 11, 12, . . . are connected to a communication network (e.g., a core network) NW via respective communication lines CL11, CL12, . . . to allow wired communication. Alternatively, the base stations 11, 12, . . . may be connected to the communication network NW to allow wireless communication. The interface between each of the base stations 11, 12, . . . and the communication network NW may be called an S1 interface.

In the first embodiment, the base station 11 is connected to the base station 12 via a communication line CL2 to allow wired communication. Alternatively, the base station 11 may be connected to the base station 12 to allow wireless communication. The interface between the base stations 11 and 12 may be called an X2 interface. In FIG. 1, the communication lines CL11, CL12, . . . and the communication lines CL2 appear to be different from one another, but may alternatively be a common physical communication cable. Further alternatively, a non-illustrated repeater, such as a router, may be disposed on the communication line CL2 between the base stations 11 and 12.

The portion including the base stations 11, 12, . . . and being closer to the communication network from the base stations 11, 12, . . . (i.e., the upper level) in the wireless communication system 1 may be called E-UTRAN, which is the abbreviation of Evolved Universal Terrestrial Radio Access Network.

The wireless terminals 21, 22, . . . communicate with base stations 11, 12, . . . that provide respective wireless areas using wireless resources provided in the respective wireless areas that the terminals are positioned. The wireless terminals 21, 22, . . . may alternatively be called mobile stations or User Equipment units (UEs).

(Configuration: Base Station)

Figure 2:
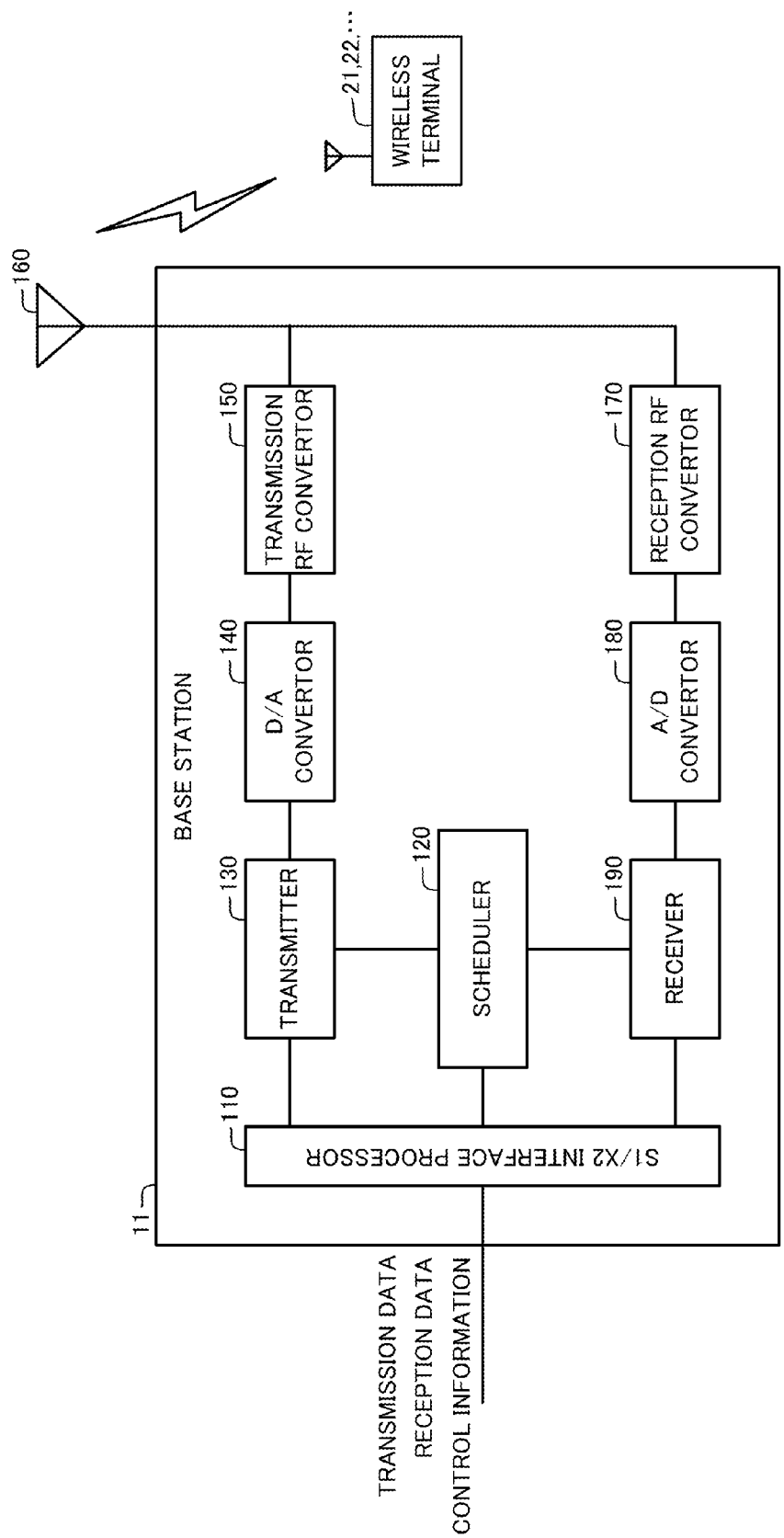
FIG. 2 is a block diagram schematically illustrating an example of the configuration of a base station of FIG. 1.

As illustrated in FIG. 2, the base station 11 exemplary includes an S1/X2 interface processor 110, a scheduler 120, a transmitter 130, a Digital to Analog (D/A) convertor 140, a transmission RF convertor 150, and an antenna 160. The term "RF" is the abbreviation of Radio Frequency. The base station 11 further includes a reception RF convertor 170, an Analog to Digital (A/D) convertor 180, and a receiver 190.

Each of the other base stations 12, . . . has the same configuration as the base station 11.

The functions of the base station 11 may be achieved by means of a Large Scale Integration (LSI). Furthermore, at least part of the functions of the base station 11 may be achieved by means of a programmable logic circuit device (e.g., a Programmable Logic Device (PLD) or a Field-Programmable Gate Array (FPGA)).

The S1/X2 interface processor 110 receives transmission data that is to be sent to the wireless terminals 21, 22, . . . from the communication network NW, and also sends reception data from the wireless terminals 21, 22, . . . to the communication network NW. Furthermore, the S1/X2 interface processor 110 receives and sends control information related to line control between the base station 11 and the wireless terminals 21, 22, . . . and related to line control between the base station 11 and the other base stations 12, . . . from and to the communication network NW. The control information of the first embodiment includes allocation information that is to be detailed below.

The scheduler 120 selects wireless terminals 21, 22, . . . that are to communicate with the base station 11 and allocates a wireless resource to be used for communication with the selected wireless terminals 21, 22, . . . . The scheduler 120 determines a demodulating scheme (or modulating scheme) and a transmission rate to be used for communication for each of the selected wireless terminals 21, 22, . . . . The determined demodulating scheme and transmission rate may be represented in the form of a Modulation and Coding Scheme (MCS) index.

The scheduler 120 sends instructions to the transmitter 130 and the receiver 190 such that the communication of the base station 11 with the wireless terminals 21, 22, . . . and the random access communication each use a wireless resources allocated to the communication.

The scheduler 120 will be detailed below.

Following the instruction from the scheduler 120, the transmitter 130 modulates transmission data that is to be sent to the wireless terminals 21, 22, . . . and outputs a downlink wireless signal.

The D/A convertor 140 performs D/A conversion on the signal output from the transmitter 130. The transmission RF convertor 150 performs frequency conversion (here, up-conversion) from the base band to the wireless frequency band on the signal after undergoing the D/A conversion. The antenna 160 sends the wireless signal after undergoing the frequency conversion at the transmission RF convertor 150.

Figure 3:
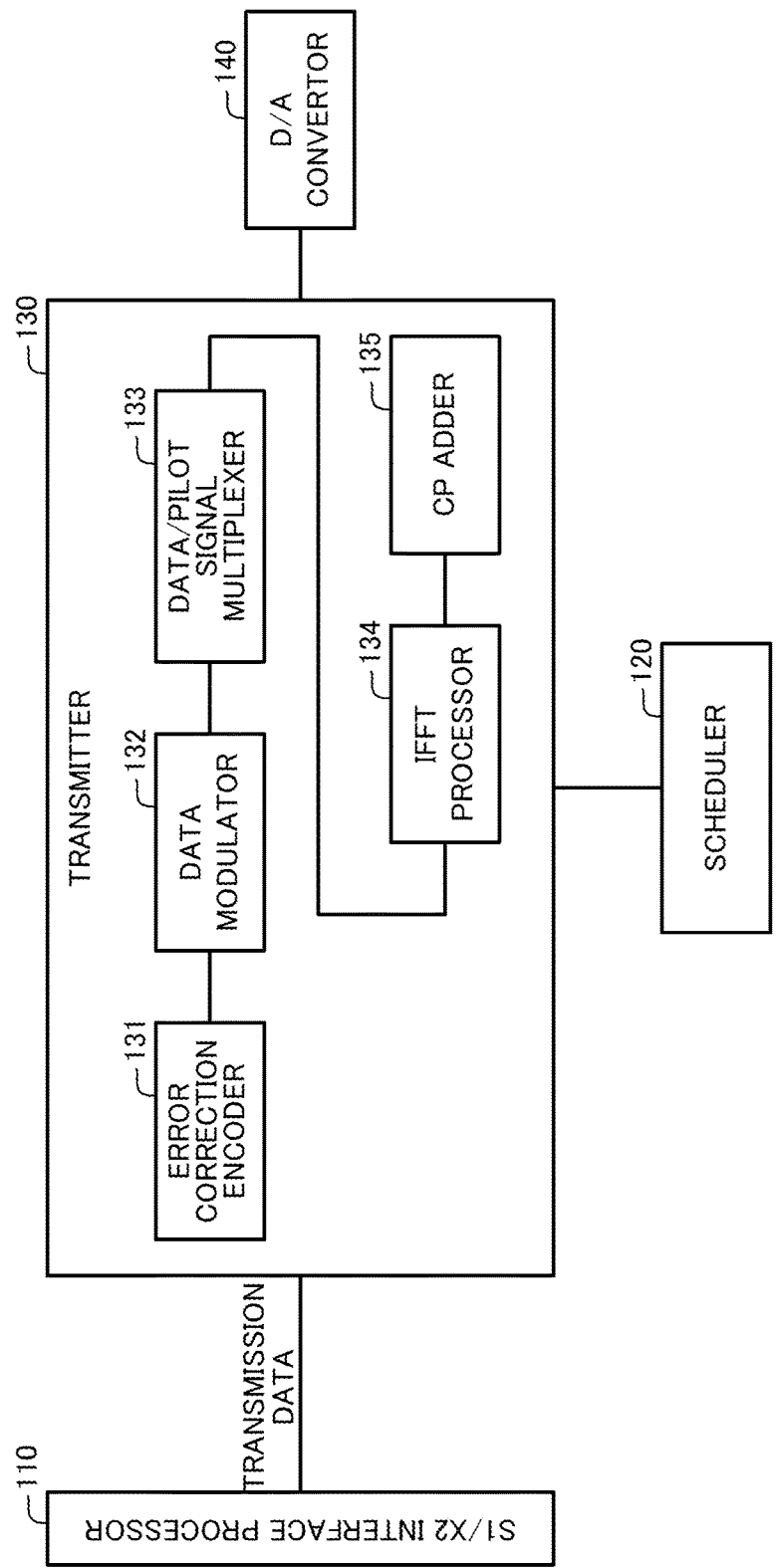
FIG. 3 is a block diagram schematically illustrating an example of the configuration of a transmitter of FIG. 2.

The transmitter 130 will now be further detailed. As illustrated in FIG. 3, the transmitter 130 includes an error correction encoder 131, a data modulator 132, a data/pilot signal multiplexer 133, an IFFT processor 134, and a CP (Cyclic Prefix) adder 135.

The error correction encoder 131 attaches an error correcting code to transmission data. Following the demodulated scheme and the transmission rate instructed by the scheduler 120, the data modulator 132 performs channel encoding and data modulating on the transmission data attached thereto the error correction code. Then, the data modulator 132 outputs the transmission data after undergoing the channel encoding and the data modulating as a transmission data signal.

Examples of the channel encoding include turbo encoding, Reed-Solomon encoding, and convolutional encoding. Examples of the data modulating are those following modulation schemes such as Quadrature Phase-Shift Keying (QPSK), 16 Quadrature Amplitude Modulation (16QAM), and 64QAM.

Following the allocation of a wireless resource determined by the scheduler 120, the data/pilot signal multiplexer 133 multiplexes the transmission data signal output from the data modulator 132 and a pilot signal. A pilot signal is an example of a known signal to the base station 11 and also to the wireless terminals 21, 22, . . . and may be called a RS, which is the abbreviation of Reference Signal.

The IFFT processor 134 performs Inverse Fast Fourier Transform (IFFT) on the signal obtained by multiplexing the transmission data signal and the pilot signal. The CP adder 135 inserts a CP into the signal after undergoing the IFFT.

The transmitter 130 outputs the signal after undergoing the insertion of CP as a downlink wireless signal.

Referring back to FIG. 2, the antenna 160 receives uplink wireless signal sent from the wireless terminals 21, 22, . . . . The reception RF convertor 170 performs frequency conversion (here, down-conversion) from the wireless frequency band to the baseband on a wireless signal received at the antenna 160. The A/D convertor 180 performs A/D conversion on the signal after undergoing the frequency conversion by the reception RF convertor 170.

Following the instruction from the scheduler 120, the receiver 190 demodulates the signal after undergoing the A/D conversion and outputs the reception data.

Figure 4:
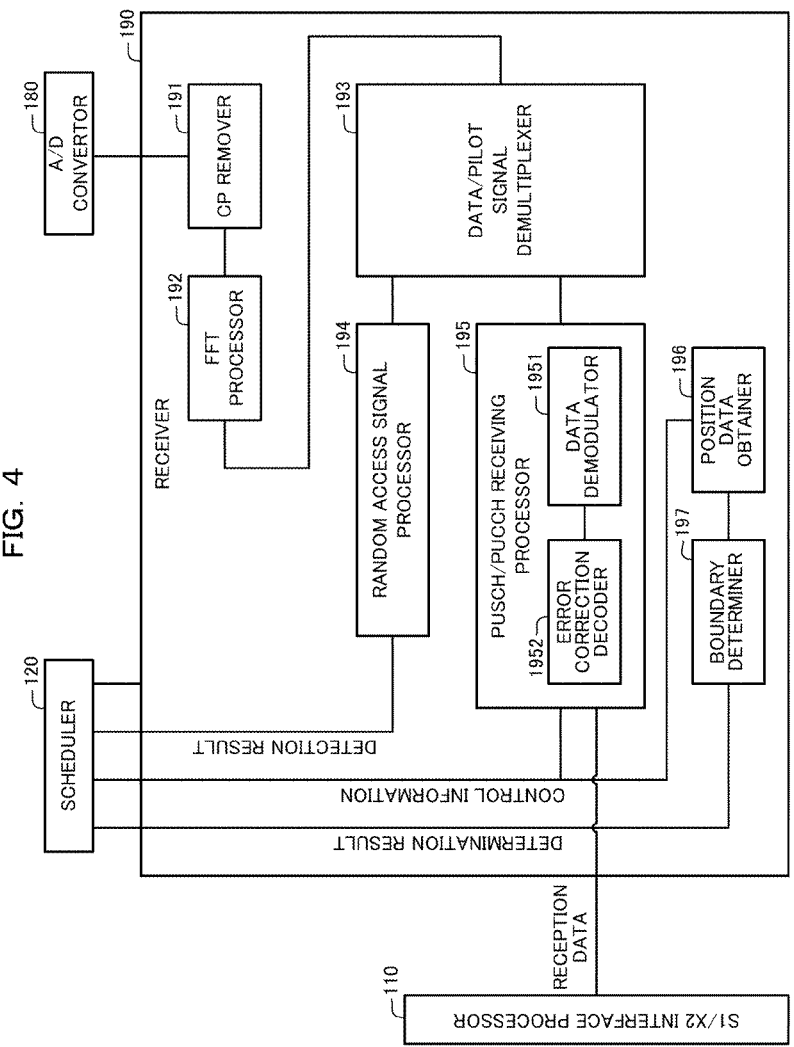
FIG. 4 is a block diagram schematically illustrating an example of the configuration of a receiver of FIG. 2.

The receiver 190 will now be further detailed here. As illustrated in FIG. 4, the receiver 190 includes a CP remover 191, an FFT processor 192, a data/pilot signal demultiplexer 193, a random access signal processor 194, a PUSCH/PUCCH receiving processor 195, a position data obtainer 196, and a boundary determiner 197.

The Term PUSCH is the abbreviation of Physical Uplink Shared Channel while the term PUCCH is the abbreviation of Physical Uplink Control Channel.

The CP remover 191 removes the CP from the signal after undergoing the A/D conversion. The FFT processor 192 performs a Fast Fourier Transform (FFT) on the signal after removing the CP therefrom.

The data/pilot signal demultiplexer 193 demultiplexes the signal after undergoing the FFT into a received data signal and the pilot signal. In the first embodiment, the received data signal includes signals of RACH, PUSCH, and PUCCH. Here, the term RACH is the abbreviation of Random Access Channel.

Here, a random access procedure will now be described.

Figure 5:
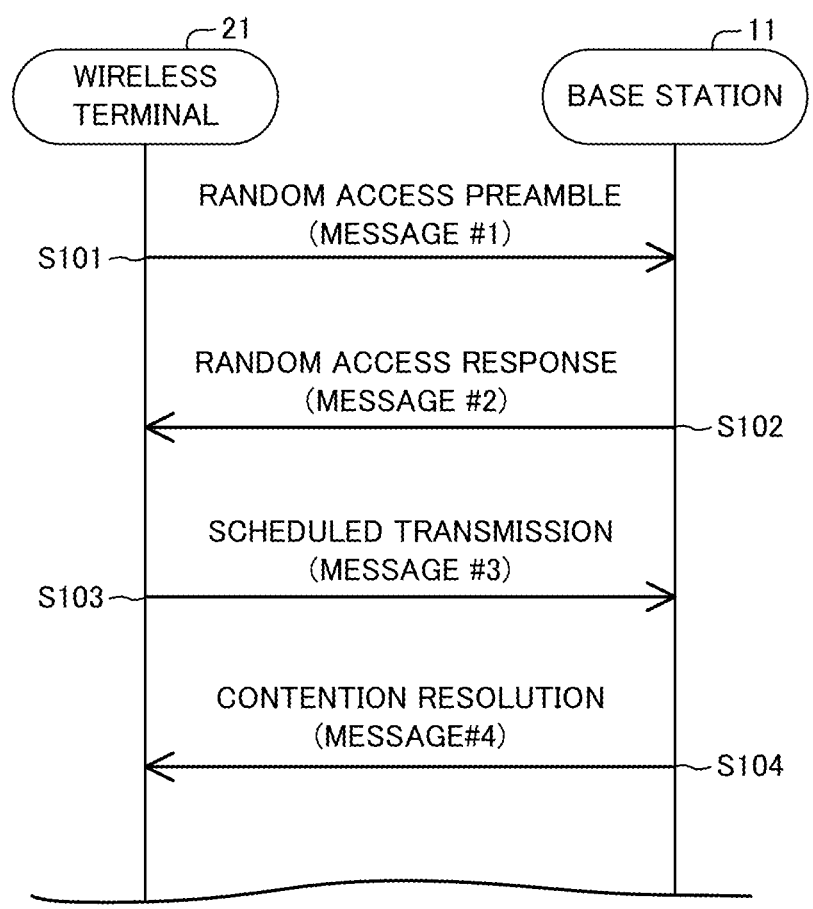
FIG. 5 is a sequence diagram illustrating an example of a random access procedure.

As illustrated in FIG. 5, when the wireless terminal 21 is establishing connection to the base station 11, the wireless terminal 21 sends a message #1 containing a preamble of a random access to the base station 11 through the RACH (step S101 of FIG. 5). The message #1 may also be called a Random Access Preamble.

For example, a preamble is generated by using a Zadoff-Chu sequence as described in Non-Patent Reference "3GPP TS36.211".

A single Zadoff-Chu sequence, when being cyclic shifted, has a small correlation between the sequence before the shifting and the sequence after the shifting. Accordingly, this makes a single Zadoff-Chu sequence possible to generate multiple preambles.

For example, the base station 11 notifies the wireless terminal 21 of information to identify a preamble group including multiple preambles in advance. In this case, the wireless terminal 21 selects a preamble from a preamble group identified by the notified information and sends the selected preamble to the base station 11. The base station 11 detects whether the wireless signal received through the RACH contains a preamble included in the preamble group identified by the notified information.

When detecting that the wireless signal received through the RACH contains the preamble, the base station 11 sends a message #2 containing the preamble contained in the received wireless signal to the wireless terminal 21 through a Physical Downlink Control Channel (PDSCH) (step S102 of FIG. 5). The message #2 may also be called a Random Access Response.

Upon receipt of the message #2 containing the preamble that has been sent to the base station 11, the wireless terminal 21 sends a message #3 to the base station 11 through a PUSCH (step S103 of FIG. 5). The message #3 may also be called Scheduled Transmission or may be a Radio Resource Control (RRC) Connection Request message.

Upon receipt of the message #3, the base station 11 sends a message #4 to the wireless terminal 21 through a Physical Downlink Shared Channel (PDSCH) (step S104 of FIG. 5). The message #4 may also be called a Contention Resolution and may be an RRC Connection Setup message.

As described above, the base station 11 establishes the connection with the wireless terminal 21 by associating the received preamble with the wireless terminal 21.

For example, the channels of PUSCH, PUCCH, PDCCH, and PDSCH are defined in Non-Patent Literature "3GPP TS36.211".

The first embodiment uses the contention based random access procedure as the random access procedure, but may use the non-contention based random access procedure. Likewise the contention based random access procedure, the wireless terminal 21 sends a preamble to the base station 11 in the non-contention based random access procedure.

Next, the random access signal processor 194 of FIG. 4 will now be described. The random access signal processor 194 detects whether the RACH signal in the received data signal obtained by the demultiplexing in the data/pilot signal demultiplexer 193 contains a preamble of random access and outputs the result of the detecting whether the RACH signal contains a preamble of random access to the scheduler 120.

In cases where the RACH signal contains a preamble of random access, the result of the detecting contains information that identify the detected preamble and a TA command. The term TA is abbreviation of Timing Advance. A TA command includes information indicating a delay time of communication from the wireless terminal 21, 22, . . . to the base station 11, 12, . . . . Alternatively, the result of the detecting may include information indicating the delay time in place of the TA command.

Figure 6:
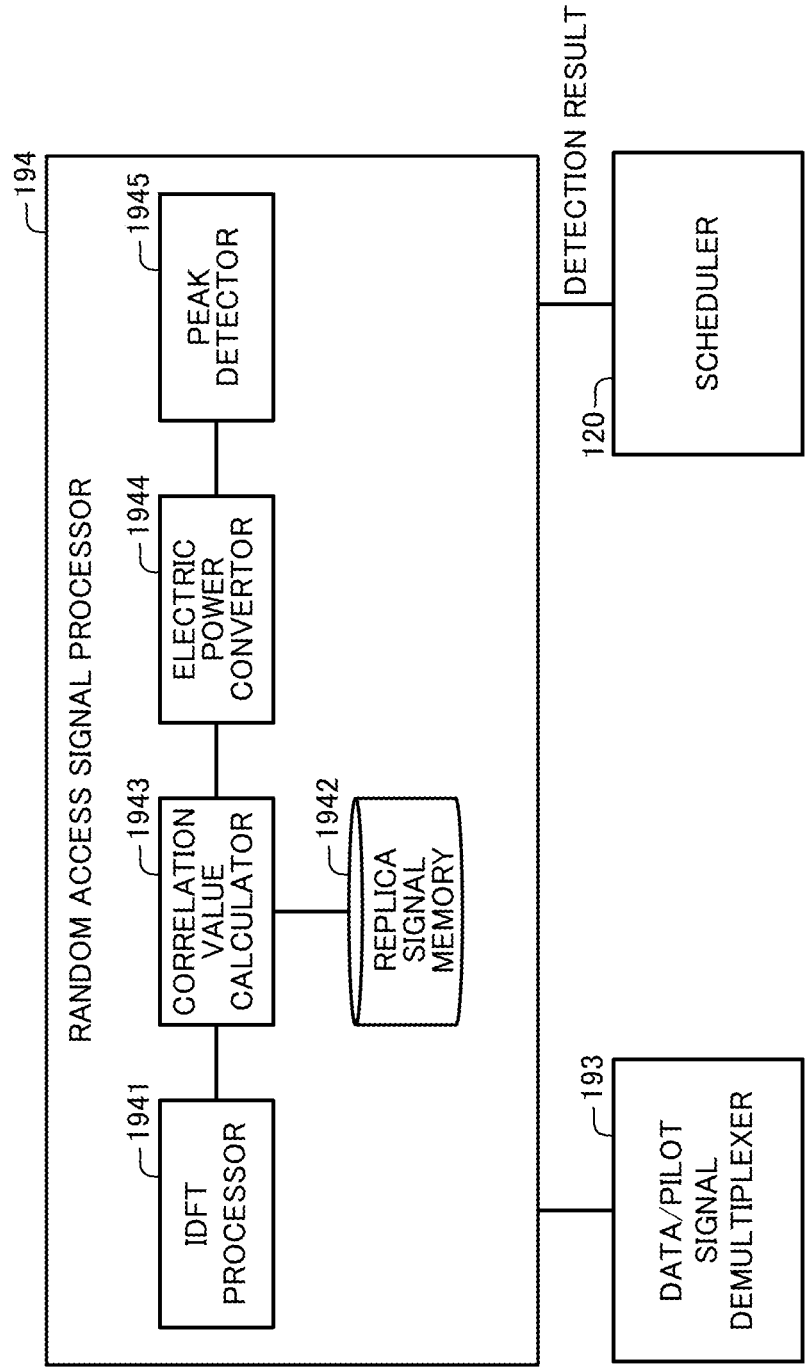
FIG. 6 is a block diagram schematically illustrating an example of the configuration of a random access signal processor of FIG. 4.

In the first embodiment, as illustrated in FIG. 6, the random access signal processor 194 includes an IDFT processor 1941, a replica signal memory 1942, a correlation value calculator 1943, an electric power convertor 1944, and a peak detector 1945.

The IDFT processor 1941 performs Inverse Discrete Fourier Transform (IDFT) on the RACH signal in the received data signal obtained by the demultiplexing in the data/pilot signal demultiplexer 193.

The replica signal memory 1942 stores therein multiple replica signals corresponding one to each of multiple preambles included in the above preamble group. Alternatively, the replica signal memory 1942 may store therein information based on which the replica signals are generated in the place of the replica signals, and generate the replica signals using the information that the memory stores.

The correlation value calculator 1943 calculates a correlation value representing a degree of correlation between the signal after undergoing the IDFT and each replica signal stored in the replica signal memory 1942. Utilizing the characteristic correlation caused from the cyclic shift of a Zadoff-Chu sequence, multiple preamble can be generated by a cyclic shift of the sequence at a constant shift value. Using preamble generated as the above can reduce the number of sequence based on which the preambles included in the preamble group are generated. Consequently, this can reduce the processing load to calculate correlation values.

Figure 7:
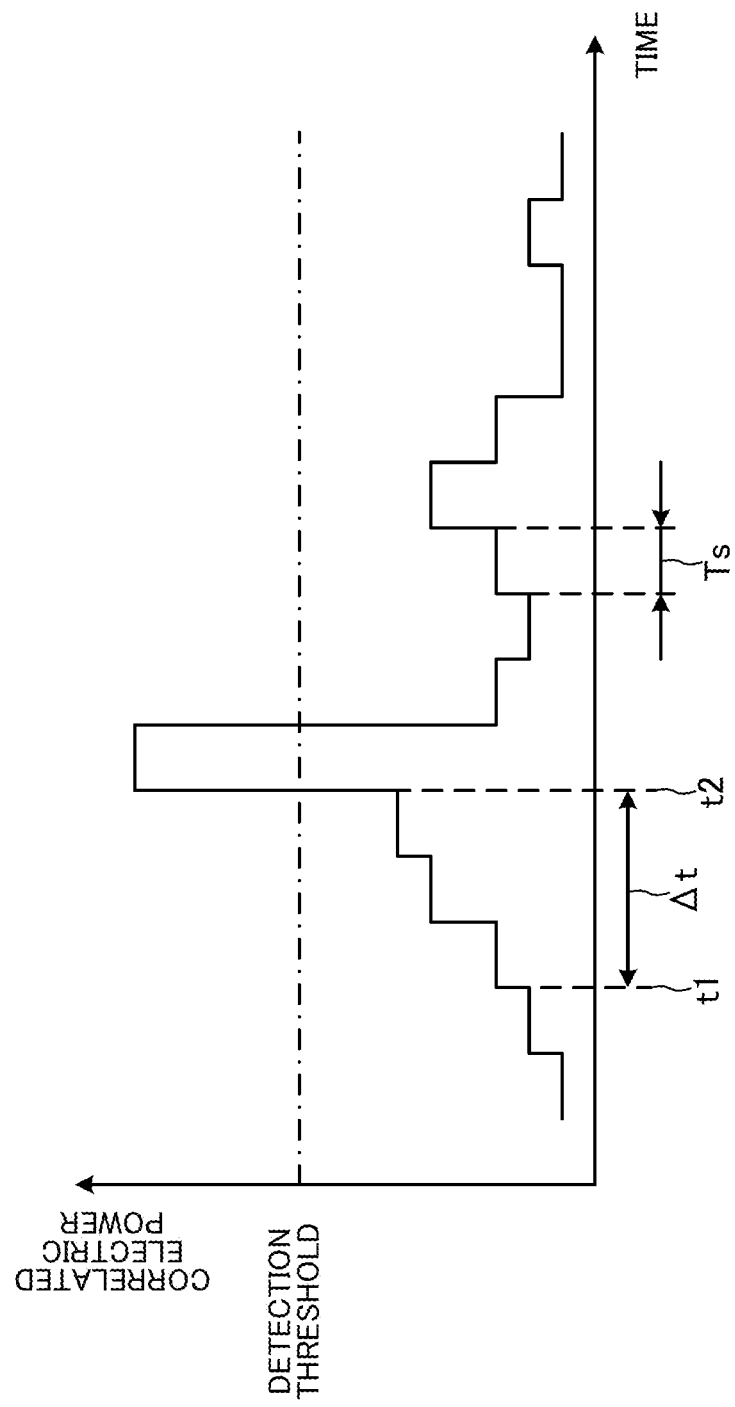
FIG. 7 is a graph depicting an example of a delay profile expressing temporal change of a correlated electric power.

The electric power convertor 1944 squares of the correlation values calculated for each replica signal by the correlation value calculator 1943 and thereby calculates the correlated electric power. The correlated electric power corresponds to the component of the replica signal that is to be detected among received electric power within a certain sampling time Ts. FIG. 7 illustrates an example of a delay profile representing a temporal change of correlated electric power.

Here, the correlation value calculator 1943 and the electric power convertor 1944 may be called a matched filter.

The peak detector 1945 obtains the peak value of the correlated electric power and the timing at which the obtained peak value is detected using the delay profile obtained for each replica signal by the electric power convertor 1944.

When the peak value obtained for one of the replica signals exceeds the detection threshold, the peak detector 1945 detects that the RACH signal includes a preamble corresponding to the replica signal. In this case, the peak detector 1945 obtains a delay time Δt between the timing t1 at which sending of the preamble is scheduled and the timing t2 at which the actual peak value is detected. As described above, the information indicating delay time Δt is contained in a TA command.

In contrast, when the peak value obtained for any of the replica signals does not exceed the detection threshold, the peak detector 1945 detects that the RACH signal does not include a preamble corresponding to the replica signal.

In the first embodiment, the random access signal processor 194 sequentially performs detection of the multiple preambles for one preamble at a time. Alternatively, the random access signal processor 194 may include multiple circuits provided one for detection of each of the preambles, so that multiple preambles are detected in parallel.

As illustrated in FIG. 4, the PUSCH/PUCCH receiving processor 195 processes a PUSCH signal and a PUCCH signal included in the received data signal obtained by the demultiplexing by the data/pilot signal demultiplexer 193 and thereby obtains the reception data and the control information. The control information of the first embodiment includes position data, and may further include information pieces of Channel Quality Indicator (CQI), Acknowledgement (ACK), and Negative ACK (NACK).

The PUSCH/PUCCH receiving processor 195 outputs the obtained reception data to the S1/X2 interface processor 110. The PUSCH/PUCCH receiving processor 195 outputs the obtained control information to the scheduler 120 and the position data obtainer 196.

In the first embodiment, the PUSCH/PUCCH receiving processor 195 includes a data demodulator 1951 and an error collection decoder 1952.

The data demodulator 1951 performs data demodulating and channel decoding on a PUSCH signal, following the demodulation scheme and the transmission rate instructed by the scheduler 120, and outputs the received data signal after undergoing the data demodulating and the channel decoding as reception data.

Likewise, the data demodulator 1951 performs data demodulating and channel decoding on a PUCCH signal, following the demodulation scheme and the transmission rate instructed by the scheduler 120, and outputs the received data signal after undergoing the data demodulating and the channel decoding as reception data.

The error collection decoder 1952 performs error correction on the reception data and the control data output by the data demodulator 1951 using an error correcting code.

The position data obtainer 196 obtains position data from the control information that the PUSCH/PUCCH receiving processor 195 outputs.

The boundary determiner 197 determines, on the basis of the position data obtained by the position data obtainer 196, whether each of the wireless terminals 21, 22, . . . is positioned at a boundary region of the wireless area. In the first embodiment, the boundary determiner 197 repeats the above determination each time a certain period elapses. Alternatively, the boundary determiner 197 may make the above determination each time the position data is obtained.

Figure 8:
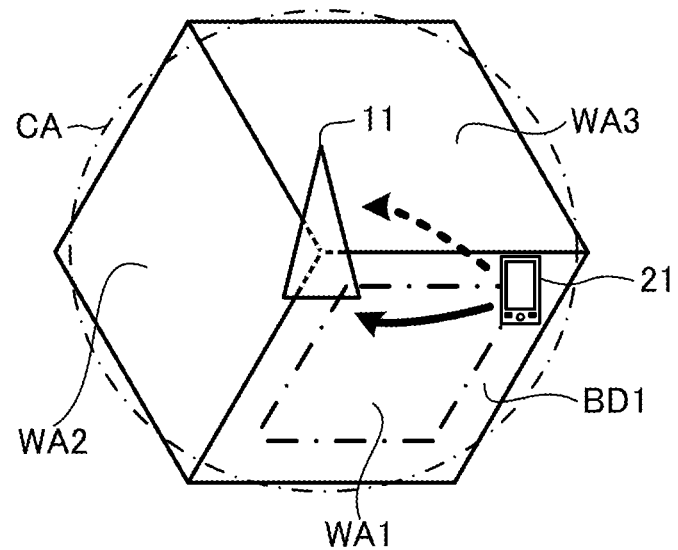
FIG. 8 is a diagram schematically illustrating an example of relationship between multiple neighboring wireless areas and a boundary region when a single base station provides the multiple neighboring wireless areas.

For example, as illustrated in FIG. 8, it is assumed that the base station 11 provides three wireless areas WA1, WA2, and WA3 and the wireless terminal 21 is positioned inside the wireless area WA1. For example, a boundary region BD1 includes a partial region of the wireless area WA1 including the boundary between the wireless area WA1 and the exterior of the wireless area. As illustrated in FIG. 8, the boundary region BD1 may have a certain width.

The boundary region BD1 may be set in accordance with the reception intensity of a wireless signal from the base station 11 which intensity is measured in advance. Alternatively, the base station 11 may provide two wireless areas, or four or more wireless areas in place of the wireless areas WA1, WA2, and WA3. The wireless areas WA1, WA2, and WA3 each may take any shape exemplified by a parallelogram, a circle, or an ellipse. In the first embodiment, not appearing in the drawing, boundary regions are also set in the wireless regions WA2 and WA3.

For example, the boundary determiner 197 retains boundary region information about the boundary region of each wireless area that the base station 11 provides in advance. The boundary determiner 197 determines whether the position indicated by the position data obtained by the position data obtainer 196 is inside a boundary region indicated by the boundary region information of each wireless area that the base station 11 provides.

The boundary determiner 197 outputs the result of the determination as to whether the position of each of the wireless terminals 21, 22, . . . is within a boundary region to the scheduler 120. In the first embodiment, the result of the determination includes terminal identification information to identify each of the wireless terminals 21, 22, . . . and boundary flag information whether each of the wireless terminals 21, 22, . . . is in a boundary region.

As one example, the boundary determiner 197 may determine whether each of the wireless terminals 21, 22, . . . is in a boundary region using the distance between the local base station 11 and the wireless terminal. For this purpose, the boundary determiner 197 may retain information of the position of the local base station 11, and a radius of the circle CA corresponding to the outermost edge of the wireless areas WA1, WA2, and WA3 that the local base station 11 covers. The boundary determiner 197 obtains the distance between the position indicated by the position data and the position of the local base station 11 indicated by the information that the boundary determiner 197 retains, and when the calculated distance is equal to or more than a certain distance threshold, determines the wireless terminal is within a boundary region. For example, the distance threshold is set to be a product of the radius indicated by the retained information and a certain coefficient. Here, the coefficient is set to be larger than zero and be equal to or less than one and is exemplified by 0.8.

Instead of the position data, the boundary determiner 197 may determine whether each of the wireless terminals 21, 22, . . . is in a boundary region, using information such as CQI notified from the wireless terminal. In this case, the quality indicated by the CQI is lower than a certain standard quality, the boundary determiner 197 may determine that the position of the wireless terminal is within a boundary region. This case may omit the function of sending the position data of the wireless terminals 21, 22, . . . .

The scheduler 120, the position data obtainer 196, and the boundary determiner 197 are examples of a controller.

Next, the details of the scheduler 120 will now be described.

(selection of wireless terminal for user data in the scheduler)

First of all, description will now be made in relation to selection of wireless terminals 21, 22, . . . that is to communicate user data. Here, the user data corresponds to transmission data and reception data, for example.

The scheduler 120 selects, for each of wireless areas that the local base station 11 provides, one or more wireless terminals that are to communicate user data from the wireless terminals 21, 22, . . . being positioned in the wireless area.

In the first embodiment, the scheduler 120 makes the above selection using an index value calculated on the basis of communication quality and a transmission rate. The communication quality is a quality of communication between the base station 11 and the wireless terminal 21, 22, . . . and is represented by, for example, CQI. The transmission rate is a data volume that is to be transmitted in a unit time.

Furthermore, the scheduler 120 sets the demodulation scheme and the transmission rate for each of the selected wireless terminals 21, 22, . . . and carries out an allocating process to allocate wireless resource to communication between the base station 11 and each selected wireless terminal. The scheduler 120 executes the allocating process on the basis of the communication environment between the base station 11 and each of the selected wireless terminals 21, 22, . . . and prospective data volume scheduled to be communicated between the base station 11 and the wireless terminal.

An example of a method for selecting (scheduling) a wireless terminal is Maximum Carrier-to-Interference Power Ratio (CIR) method, or Proportional Fairness (PF) method.

(Selection of Wireless Terminal for Random Access in the Scheduler)

Next, description will now be made in relation to selection of one or more wireless terminals 21, 22, . . . that are to perform random access communication.

On the basis of the result of the detection by the random access signal processor 194, the scheduler 120 selects one or more wireless terminals that is to undergo random access communication from the wireless terminals 21, 22, . . . that have sent the detected preambles to the base station 11. The random access procedure includes both uplink and downlink communication. Part of the random access procedure is exemplified by the above steps S103-S104 of FIG. 5.

Furthermore, the scheduler 120 carries out an allocating process to allocate wireless resource to be used for communication between the base station 11 and each of the selected wireless terminals 21, 22, . . . .

During the random access communication, the base station 11 is incapable of recognizing the communication environment between the base station 11 and each of the wireless terminals 21, 22, . . . and the data volume scheduled to be communicated between the base station 11 and the wireless terminal. Accordingly, the scheduler 120 allocates a least data volume that enables to communicate a random access message to the communication.

(Allocation of a Wireless Resource by the Scheduler)

Next, detailed description will now be made in relation to allocation of a wireless resource.

A wireless resource is divided into multiple frames in a time base. Each frame has a certain time length (e.g., 10 ms) and consists of multiple (e.g., ten) subframes. Each subframe has a certain time length (e.g., 1 ms).

In the first embodiment, the scheduler 120 carries out allocating of the wireless resource on a unit of a resource block (RB), which corresponds to a portion having a certain frequency band width in a single subframe.

In the first embodiment, subframes having RBs that the base station 11, 12, . . . allocates to communication (i.e., RACH) of the preamble of random access are predetermined. For example, such subframes are set using information called RACH Configuration.

In the first embodiment, subframes having RBs that are to be allocated to RACH are set to be different with neighboring wireless areas. This causes a subframe, which sends a preamble in a first wireless area, not to be sent in a second wireless area neighboring the first wireless area.

Accordingly, this makes it possible to avoid a circumstance where a preamble sent in the second wireless area is received in the first wireless area by the base station 11, using a subframe undergoing detection of a preamble in the first wireless area. Consequently, the possibility of erroneously detecting a preamble in the first wireless area can be reduced. An example of allocating of a subframe to the RACH is disclosed in Japanese Laid-Open Patent Publication No. 2010-183287.

Under a case where the wireless terminal 21 is positioned in the boundary region BD1 of the wireless area WA1 as illustrated in FIG. 8, the base station 11 sometimes receives a wireless signal that the wireless terminal 21 has sent in the wireless area WA1 also in the wireless area WA3.

Here, the wireless communication system assumes that a wireless resource to be used for data communication in the wireless area WA1 is allocated regardless of a wireless resource allocated to the RACH in the neighboring wireless area WA3 adjoining the wireless area WA1.

In the above assumed wireless communication system, the wireless resource that is allocated to the RACH in the wireless area WA3 is sometimes allocated also to the uplink communication of the wireless terminal 21 in the wireless area WA1. In this case, the base station 11 has a possibility of erroneously detecting a wireless signal that the wireless terminal 21 has sent through the PUSCH in the wireless area WA1 to be a preamble in the wireless area WA3.

Alternatively, the wireless signal that the wireless terminal 21 has sent through the PUSCH in the wireless area WA1 has a possibility of reaching, as an interfering signal, the base station 11 in the wireless area WA3. Accordingly, the base station 11 has a possibility of detecting a preamble that the wireless terminal 22, . . . except for the wireless terminal 21 has sent in the wireless area WA3 to be another preamble due to the presence of the interfering signal. As the above, the assumed wireless communication system has a possibility that the base station 11 erroneously detects the preamble.

This circumstance also occurs when multiple base stations provide multiple neighboring wireless areas.

Figure 9:
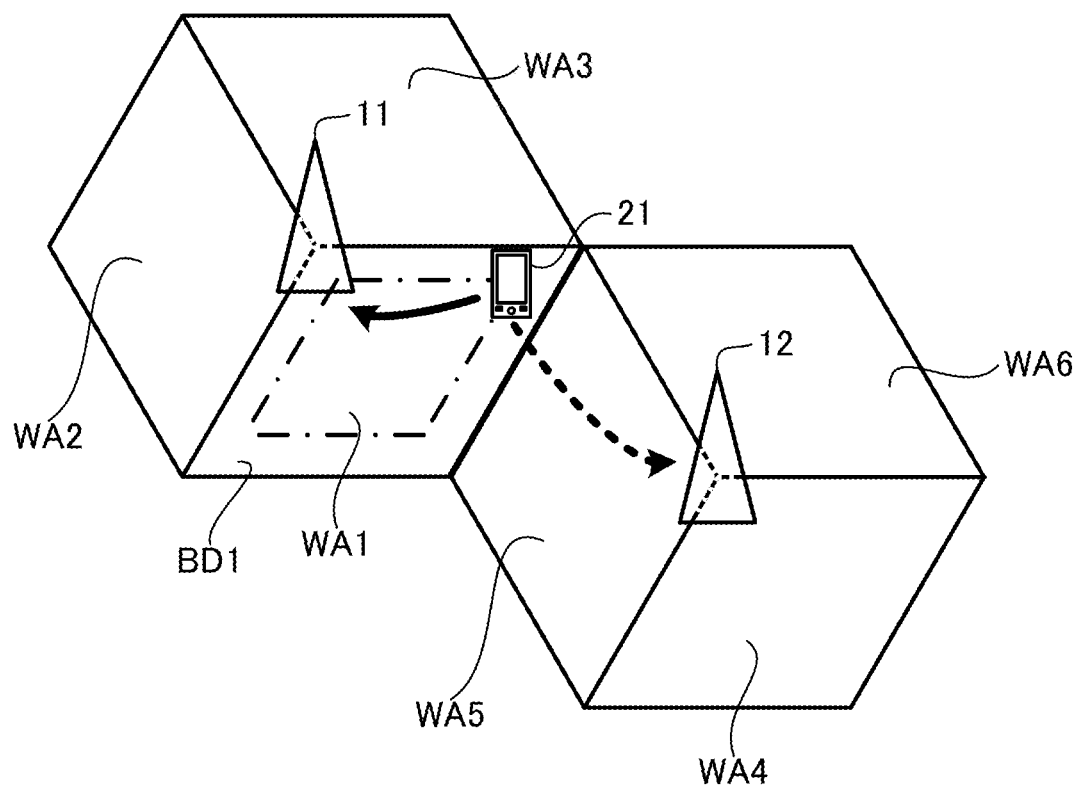
FIG. 9 is a diagram schematically illustrating an example of relationship between multiple neighboring wireless areas and a boundary region when multiple base stations provide each of the multiple neighboring wireless areas.

For example, a wireless communication system illustrated in FIG. 9 assumes that the base station 11 provides three wireless areas WA1, WA2, and WA3 while the base station 12 provides three wireless areas WA4, WA5, and WA6. This system also assumes that the wireless area WA1 adjoins the wireless area WA5 and the wireless terminal 21 is positioned in the wireless area WA1.

Also in the above assumed wireless communication system, the wireless resource that is allocated to the RACH in the wireless area WA5 is sometimes allocated also to the uplink communication of the wireless terminal 21 in the wireless area WA1. In this case, the base station 12 has a possibility of erroneously detecting a wireless signal that the wireless terminal 21 has sent through the PUSCH in the wireless area WA1 to be a preamble in the wireless area WA5.

Alternatively, the wireless signal that the wireless terminal 21 has sent through the PUSCH in the wireless area WA1 has a possibility of reaching, as an interfering signal, the base station 12 in the wireless area WA5. Accordingly, the base station 12 has a possibility of detecting a preamble that the wireless terminal 22, . . . except for the wireless terminal 21 has sent in the wireless area WA5 to be another preamble due to the presence of the interfering signal. As the above, the assumed wireless communication system has a possibility that the base station 12 erroneously detects the preamble.

As a solution to the above, the frequency band of a wireless resource are set to be different with multiple neighboring wireless areas. However, when each wireless area uses a considerably wide frequency band, part or entire frequency bands of wireless resources of multiple neighboring wireless areas frequently overlap.

Considering the above, the scheduler 120 of the first embodiment controls allocation of wireless resource to communication via the PUSCH in each wireless area that the local base station 11 provides, using allocation information of one or more wireless areas adjoining the wireless area of the base station 11. In other words, in controlling the allocation of a wireless area to the communication via the PUSCH in each wireless area that the local base station 11 provides, the scheduler 120 refers to the allocation information of one or more wireless area adjoining the wireless area of the local base station 11. The allocation information includes information representing allocation of a wireless resource allocated to the RACH.

In the first embodiment, the scheduler 120 determines a basic range serving as a first range of a wireless resource allocatable to the communication via the PUSCH. As to be detailed below, the scheduler 120 further obtains allocation information and determines a restriction range serving as a second range of a wireless resource allocatable to the communication via the PUSCH. For example, the scheduler 120 determines the above ranges each time the allocation information is obtained. Alternatively, the scheduler 120 may determine these ranges only when the allocation information obtained this time is different from the allocation information obtained the last time.

In the first embodiment, a rang of a wireless resource is identified by time and frequency, and is a RB group including at least one RB.

Hereinafter, a wireless area that is to undergo allocation of a wireless resources via the PUSCH is referred to as an allocation target wireless area. A wireless area adjoining an allocation target wireless area is referred to as a neighboring wireless area. An allocation target wireless area and a neighboring wireless area are examples of a first wireless area and a second wireless area, respectively.

The basic range is part of the wireless resource except for part allocated to the PUCCH and the RACH in the allocation target wireless area.

The restriction range is the remainder of excluding part allocated to the RACH in the neighboring wireless area from the basic range.

Here, a basic range and a restriction range will now be detailed with reference to FIG. 10.

Figure 10:
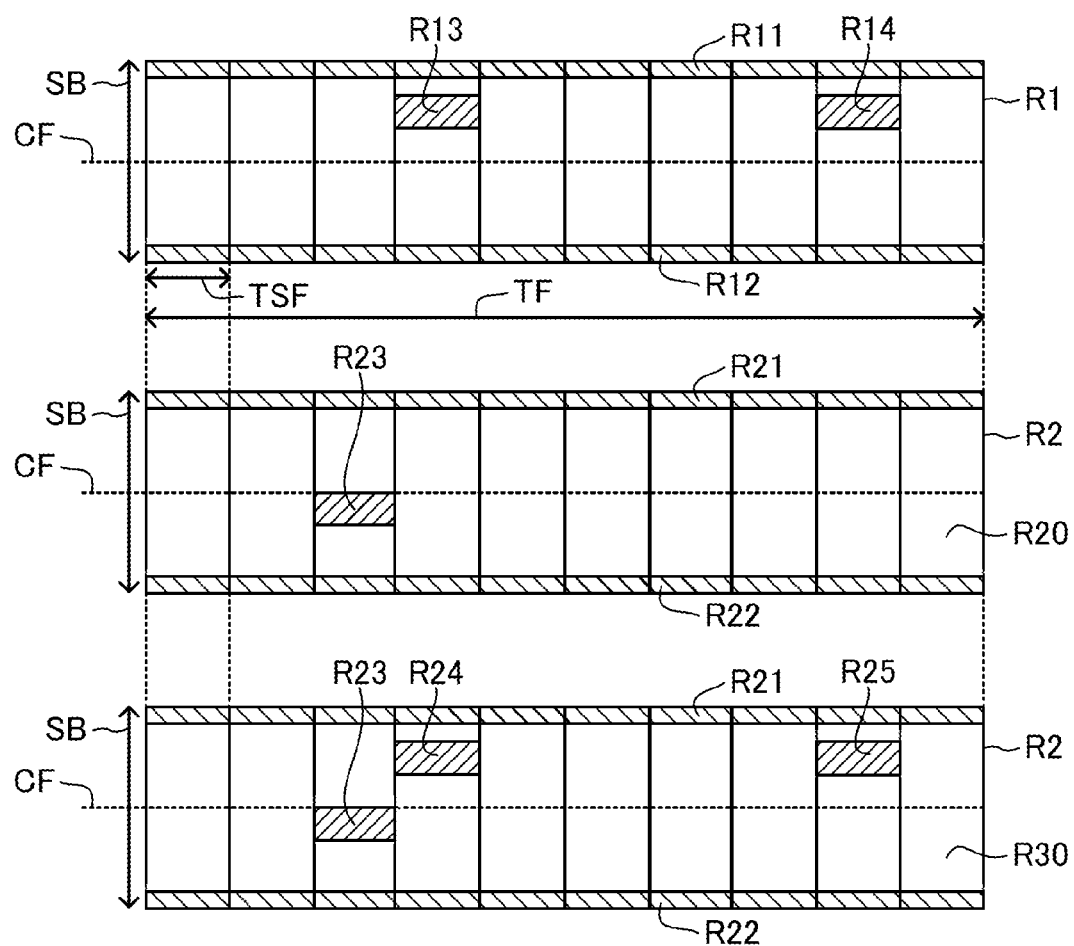
FIG. 10 is a diagram schematically illustrating an example of a basic range and a restriction range that a base station of FIG. 1 uses.

FIG. 10 is an example of allocation of a wireless resource in unit of a frame. Frames R1 and R2 have system bandwidths SB serving as frequency bandwidth. The center frequency of each system bandwidth SB is represented by a carrier frequency CF. The frames R1 and R2 have a first time length TF and each consist of ten subframes each having a second time length TSF.

In the first embodiment, the carrier frequency CF of the wireless resource in an allocation target wireless area coincides with the carrier frequency CF of the wireless resource of the neighboring wireless area.

The frame R1 includes elements R11 and R12 allocated to the PUCCH in the neighboring wireless area and elements R13 and R14 allocated to the RACH in the neighboring wireless area.

The basic range R20 is obtained by excluding the elements R21 and R22 allocated to the PUCCH in the allocation target wireless area and the element R23 allocated to the RACH in the allocation target wireless area from the frame R2 in the allocation target wireless area.

The restricting range R30 is obtained by excluding the elements R21-R25 of the wireless resource from the frame R2 in the allocation target wireless area. The elements R21 and R22 are allocated to the PUCCH in the allocation target wireless area while the element R23 is allocated to the RACH in the allocation target wireless area. The elements R24 and R25 are allocated to the RACH in the neighboring wireless area. Therefore, the elements R24 and R25 are the same resources as the elements R13 and R14 allocated to the RACH in the neighboring wireless area.

The scheduler 120 allocates the wireless resource to communication in the allocation target wireless area with the wireless terminals 21, 22, . . . via the PUSCH.

At that time, when the result of determining made by the boundary determiner 197 indicates that the wireless terminal 21, 22, . . . is not positioned in a boundary region, the scheduler 120 allocates the wireless resource of the basic range to the communication with the wireless terminal 21, 22, . . . . On the other hand, when the result of determining made by the boundary determiner 197 indicates that the wireless terminal 21, 22, . . . is positioned in a boundary region, the scheduler 120 allocates the wireless resource of the restriction range to the communication with the wireless terminal 21, 22, . . . .

This reduces the possibility of erroneously detecting a preamble of the random access caused when the base stations 11, 12, . . . that provide neighboring wireless areas receive an interfering signal based on data send in the allocation target wireless area via the PUSCH In the first embodiment, in cases where the wireless terminal 21, 22, . . . is positioned in a boundary region and the restriction range is out of allocatable wireless resource, the scheduler 120 does not allocated a wireless resource to the communication with the wireless terminal 21, 22, . . . . Alternatively, even when the wireless terminal 21, 22, . . . is positioned in a boundary region and the restriction range is out of allocatable wireless resource, the scheduler 120 may allocate the wireless resource of the basic range to the communication with the wireless terminal 21, 22, . . . .

Next, description will now be description in relation to a manner of obtaining the allocation information.

As in the example of FIG. 8, when the neighboring area and the allocation target wireless area are provided by the same base station 11, the scheduler 120 obtains the allocation information of the neighboring wireless area which information is retained in the local base station 11.

As in the example of FIG. 9, when the neighboring wireless area and the allocation target wireless area are provided by different base stations 11, 12, . . . , the scheduler 120 obtains the allocation information included in the control information received at the S1/X2 interface processor 110.

In the first embodiment, the allocation information includes information to specify an RB allocated to the RACH. An example of allocation information may include a subframe ID that specifies a subframe and an RBID that specifies a RB in a single subframe. Further, the allocation information may contain information representing the carrier frequency.

In the first embodiment, in cases where a neighboring area adjoining the wireless area that the base station 11 provides is provided by another base station 12, . . . , the local base station 11 sends a request for allocation information to the other base station 12, . . . . The request for allocation information indicates that the sender requests to send the allocation information. For example, a request for allocation information may include information to identify the wireless area. For example, the base station 11 sends a request for allocation information each time a certain time period elapses.

Upon receipt of a request for allocation information from another base station 12, . . . , the base station 11 sends the other base station 12, . . . the allocation information of each wireless area that the local base station 11 provides. In cases where the request for allocation information includes information to identify a wireless area, the base station 11 sends allocation information of the wireless area identified by the information to the other base station 12, . . . .

Alternatively, the base station 11 may send the allocation information to the other base station 12, . . . irrespective of whether the base station 11 receives a request for allocation information. In this case, the base station 11 does not have to send any allocation information to the other base station 12, . . . . Alternatively, the base station 11 may send allocation information when the allocation information is changed.

The S1/X2 interface processor 110 and the scheduler 120 serve as an example of an obtainer.

(Configuration: Wireless Terminal)

Figure 11:
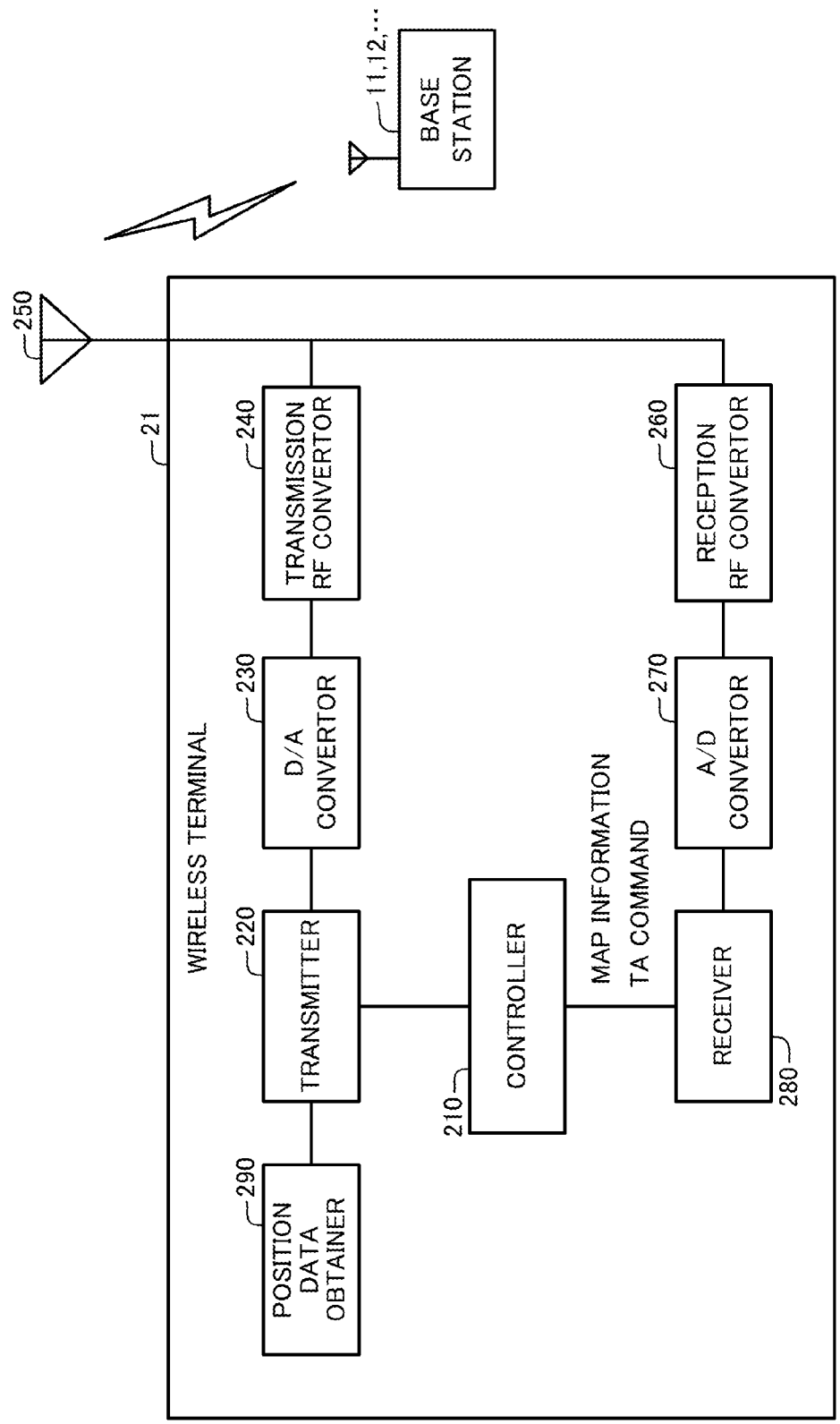
FIG. 11 is a block diagram schematically illustrating an example of the configuration of a wireless terminal of FIG. 1.

As illustrated in FIG. 11, the wireless terminal 21 exemplarily includes a controller 210, the transmitter 220, the D/A convertor 230, a transmission RF convertor 240, the antenna 250, a reception RF convertor 260, an A/D convertor 270, a receiver 280, and a position data obtainer 290. Each of the remaining wireless terminals 22, . . . has the same function as the wireless terminal 21.

The functions of the wireless terminal 21 may be achieved by means of an LSI. Furthermore, at least part of the functions of the wireless terminal 21 may be achieved by means of a programmable logic circuit device (e.g., a PLD or an FPGA).

The antenna 250 receives downlink wireless signal sent from the base station 11, 12, . . . . The reception RF convertor 260 performs frequency conversion from the wireless frequency band to the baseband on a wireless signal received at the antenna 250. The A/D convertor 270 performs A/D conversion on the signal after undergoing the frequency conversion by the reception RF convertor 260.

Following the instruction from the controller 210, the receiver 280 demodulates the signal after undergoing the A/D conversion and thereby obtains the reception data and control information. In the first embodiment, the control information includes map information and a TA command. The map information includes information to specify a wireless resource allocated to uplink communication and downlink communication. The receiver 280 outputs the received control information to the controller 210.

The controller 210 sends instructions to the transmitter 220 and the receiver 280 such that the communication with the base stations 11, 12, . . . and the random access communication each use a wireless resources allocated to the communication by the map information from the receiver 280. At this time, the controller 210 outputs instructions to the transmitter 220 such that the uplink communication is executed at the timing adjusted on the basis of the TA command from the receiver 280.

Following the instruction from the controller 210, the transmitter 220 modulates transmission data that is to be sent to the base stations 11, 12, . . . and outputs an uplink signal.

The D/A convertor 230 performs D/A conversion on the signal output from the transmitter 220. The transmission RF convertor 240 performs frequency conversion from the base band to the wireless frequency band on the signal after undergoing the D/A conversion. The antenna 250 sends the wireless signal after undergoing the frequency conversion at the transmission RF convertor 240.

The position data obtainer 290 obtains the position data representing the position of the local terminal 21. In the first embodiment, the position data obtainer 290 obtains the position data using the Global Positioning System (GPS). The position data obtainer 290 outputs the obtained position data to the transmitter 220.

The wireless terminal 21 sends the position data obtained by the position data obtainer 290 to the base stations 11, 12, . . . . The wireless terminal 21 may send the position data each time a certain time period elapses or may send the position data to the base stations 11, 12, . . . in response to a request from the base stations 11, 12, . . . .

The position data of the first embodiment represents the latitude and the longitude. An example of the position data is information called ellipsoid-Point-r10 included in information called LocationInfo-r10. The LocationInfo-r10 and the ellipsoid-Point-r1 are described in Non-Patent Literature "3GPP TS36.331". Alternatively, the information representing the latitude and the longitude may be information called degreesLatitude and degreesLongitude, which is described in Non-Patent Literature "3GPP TS36.355".

(Operation)

Next, the operation of the wireless communication system 1 will now be described, focusing on detection of a preamble and allocation of a wireless resource to communication via the PUSCH.

In the first embodiment, an operation related to one (called the allocation target wireless area) among multiple wireless areas that the base station 11 provides will now be described, but the same description can be applied to the remaining wireless areas. The following description assumes that a neighboring wireless area is provided by another base station 12 different from the local station 11, but can also be applied to a case where the neighboring wireless area is provided by the same local station 11.

Figure 12:
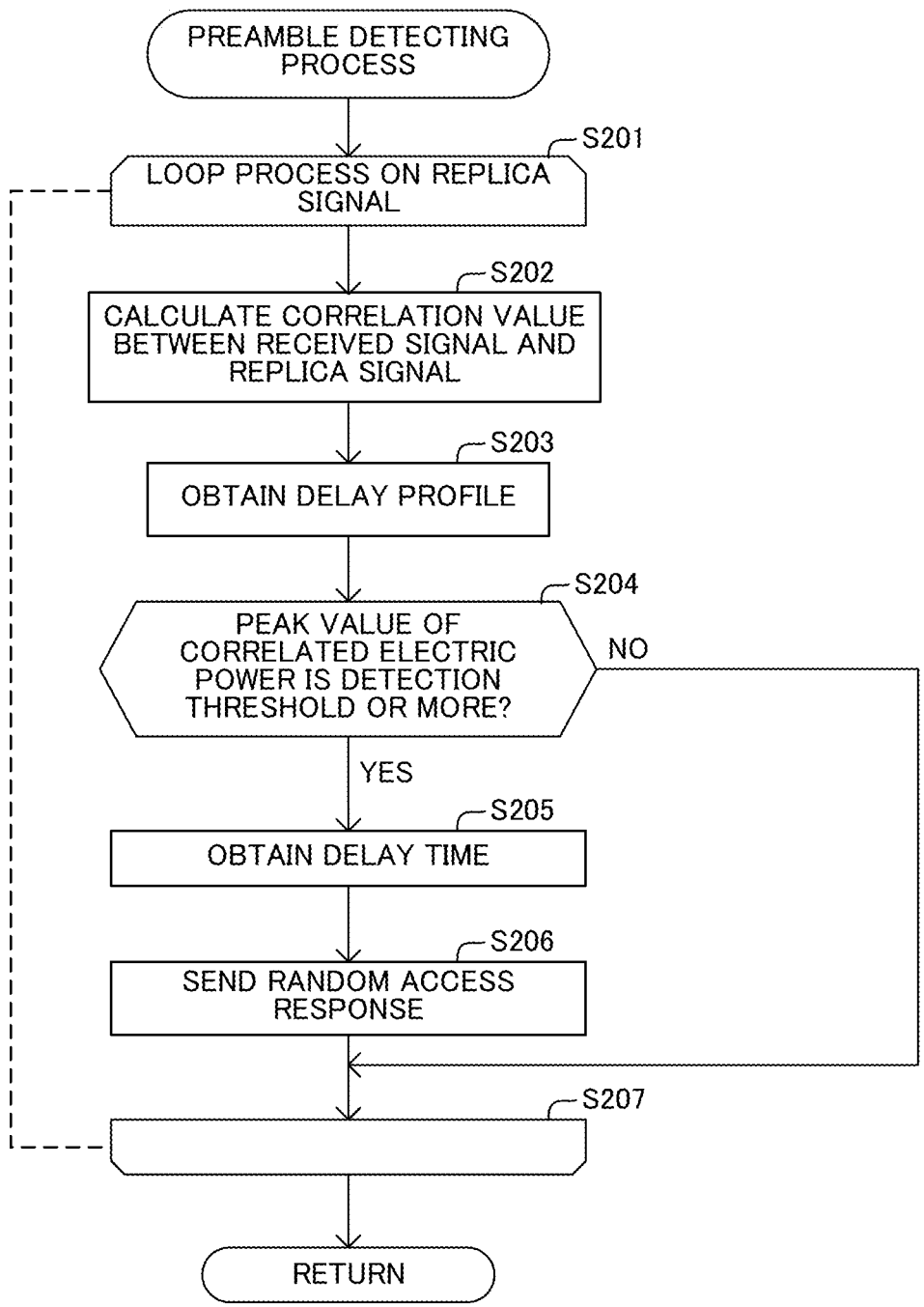
FIG. 12 is a flow diagram denoting an example of a succession of procedural steps of a preamble detecting process that a base station of FIG. 1 performs.

The base station 11 executes a preamble detecting process denoted in the flow diagram of FIG. 12 each time the base station 11 receives a RACH signal.

In the first embodiment, the base station 11 executes a loop process (see steps S201-S207 of FIG. 12) on multiple replica signals corresponding one to each of multiple preambles included in the above preamble group one at each time.

At the start of the loop process, the base station 11 calculates a correlation value between the received RACH signal and a replica signal to be processed (step S202 of FIG. 12). The received RACH signal is also referred to as a received RACH signal.

Next, the base station 11 obtains a delay profile based on the calculated correlation value (step S203 of FIG. 12), and determines, by referring to the obtained delay profile, whether the peak value of the correlated electric power is equal to or more than detection threshold (step S204 of FIG. 12).

When the peak value of the correlated electric power is less than the detection threshold, the base station 11 determines "No" in step S204 and returns the procedure to step S202. On the other hand, when the peak value of the correlated electric power is equal to or more than the detection threshold, the base station 11 determines "Yes" in step S204 and obtains the delay time (step S205 of FIG. 12). Then, the base station 11 sends a random access response including a TA command containing information indicating the obtained delay time and also including a preamble corresponding to the replica signal to be processed (step S206 of FIG. 12). Then, the base station 11 returns the procedure to step S202.

The base station 11 carries out the above loop process (i.e. steps S201-S207) on all the replica signals and then terminates the preamble detecting process of FIG. 12.

Figure 13:
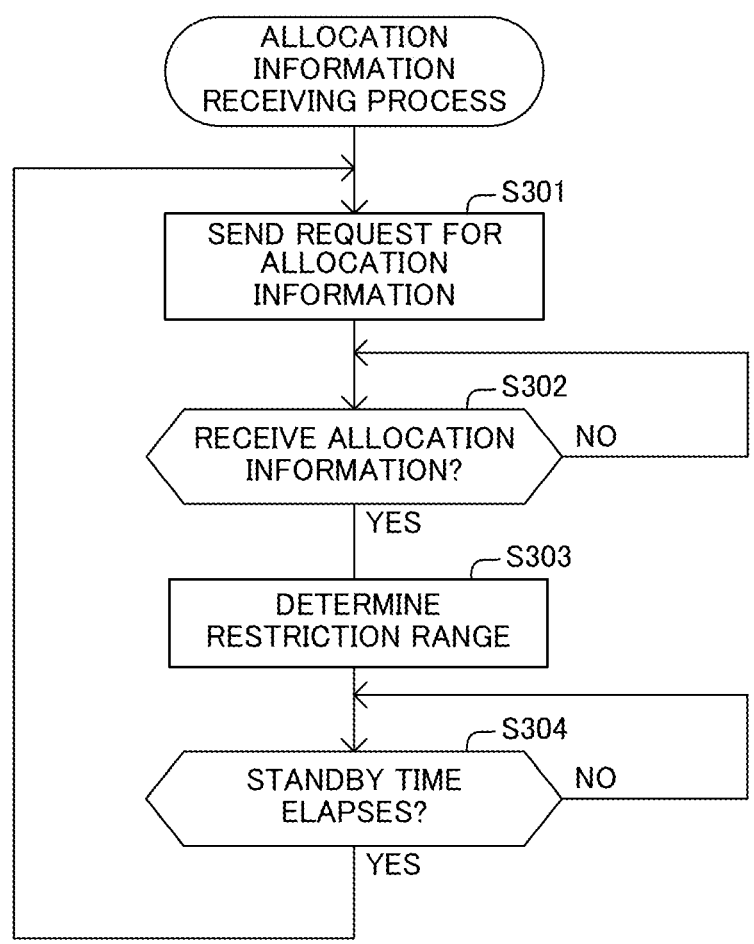
FIG. 13 is a flow diagram denoting an example of a succession of procedural steps of an allocation information receiving process that a base station of FIG. 1 performs.

Furthermore, the base station 11 executes an allocation information receiving process along the flow diagram of FIG. 13.

In the first embodiment, the base station 11 sends a request for allocation information to the base station 12 (step S301 of FIG. 13), and is on standby until receiving allocation information ("No" route in step S302 of FIG. 13).

Upon receipt of the request for allocation information, the base station 12 sends the allocation information to the base station 11. Thereby, the base station 11 receives the allocation information from the base station 12. After that, the base station 11 determines "Yes" in step S302 and determines the restriction range based on the received allocation information (step S303 of FIG. 13). Then the base station 11 is on standby until a waiting time elapses ("No" route in step S304 of FIG. 13). When a certain waiting time elapses, the base station 11 determines "Yes" in step S304 and returns the procedure to step S301 to repeat steps S301-S304. Performing this process, the base station 11 obtains the latest allocation information from the base station 12, and determines the restriction range on the basis of the obtained allocation information.

Figure 14:
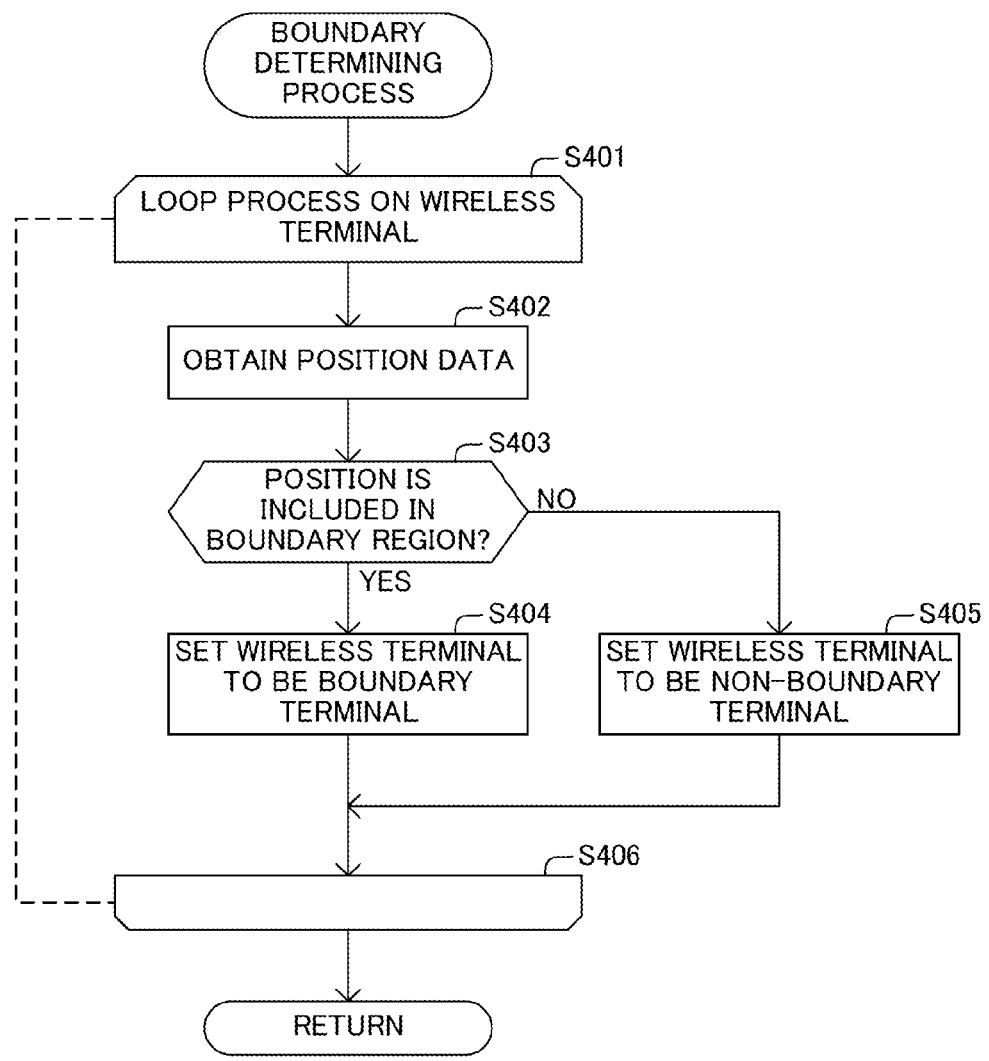
FIG. 14 is a flow diagram denoting an example of a succession of procedural steps of a boundary determining process that a base station of FIG. 1 performs.

Besides, the base station 11 carries out a boundary determining process along the flow diagram of FIG. 14 each time a certain time period elapses.

In the first embodiment, the base station 11 carries out a loop process on the wireless terminals 21, 22, . . . positioned in the allocation target wireless area one terminal at each time (steps S401-S406 of FIG. 14).

At the start of the loop process, the base station 11 obtains the position data from the target wireless terminal 21, 22, ... to be processed (step S402 of FIG. 14). Next, the base station 11 determines whether the position indicated by the obtained position data of the target wireless terminal is included in the boundary region indicated by the boundary region information that the base station 11 retain (step S403 of FIG. 14).

In cases where the position is included in the boundary region, the base station 11 determines "Yes" in step S403 and sets the corresponding target wireless terminal to be a boundary terminal (step S404 of FIG. 14). In the first embodiment, the base station 11 stores terminal identification information that identifies the target wireless terminal 21, 22, ... and the boundary flag information indicating that the position of the target wireless terminal is included in the boundary region in association with each other.

On the other hand, in cases where the position is not included in the boundary region, the base station 11 determines "No" in step S403 and sets the corresponding target wireless terminal to be a non-boundary terminal (step S405 in FIG. 14). In the first embodiment, the base station 11 stores terminal identification information that identifies the target wireless terminal 21, 22, ... and the boundary flag information indicating that the position of the target wireless terminal is not included in the boundary region in association with each other.

After that, the base station 11 returns the procedure to step S401.

Then the base station 11 carries out the above loop process (steps S401-S406) on each individual wireless terminals 21, 22, ... positioned in the allocation target wireless area and then terminates the boundary determining process of FIG. 14.

Figure 15:
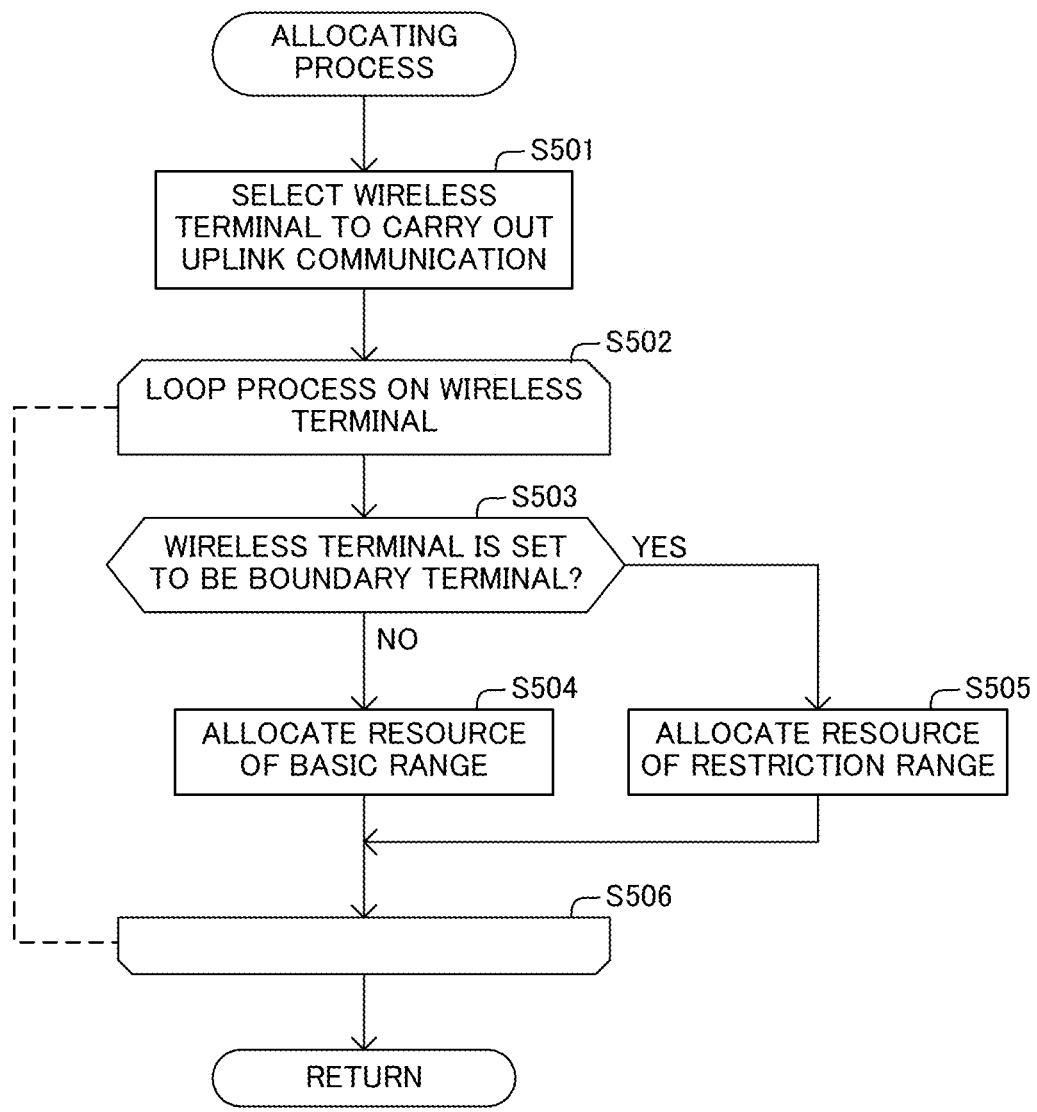
FIG. 15 is a flow diagram denoting an example of a succession of procedural steps of an allocating process that a base station of FIG. 1 performs.

In addition, the base station 11 carries out an allocating process along the flow diagram of FIG. 15 each time certain time period elapses.

In the first embodiment, the base station 11 selects one or more wireless terminals that are to execute uplink communication in the allocation target wireless area among the wireless terminals 21, 22, ... positioned in the allocation target wireless area (step S501 of FIG. 15).

After the selection, the base station 11 carries out a loop process (steps S502-S506 in FIG. 15) on the selected wireless terminals 21, 22, ... one terminal at each time.

At the start of the loop process, the base station 11 determines whether a target wireless terminal (22, ... ) to be processed is set to be a boundary terminal (step S503 of FIG. 15).

In cases where a target wireless terminal is set to be a boundary terminal, the base station 11 determines "Yes" in step S503, and allocates the wireless resource within the restriction range determined as the above to communication with the target wireless terminal in the allocation target wireless area (step S505 of FIG. 15).

On the other hand, in cases where the target wireless terminal is set to be a non-boundary terminal, the base station 11 determines "No" in step S503, and allocates the wireless resource within the basic range to communication with the target wireless terminal in the allocation target wireless area (step S504 of FIG. 15).

After that, the base station 11 returns the procedure to step S502.

The base station 11 carries out the above loop process (steps S502-S506) on all the selected wireless terminals 21, 22, ... and then terminates the allocating process of FIG. 15.

As described above, the base station 11 of the first embodiment obtains allocation information indicating allocation of a wireless resource to be used for communicating a preamble of random access in the neighboring wireless area. Furthermore, on the basis of the obtained allocation information, the base station 11 controls allocation of a wireless resource to be used for communication with the wireless terminals 21, 22, ... in the allocation target wireless area.

Accordingly, the base station 12 providing the neighboring wireless area can reduce the possibility of erroneously detecting a preamble of random access which is caused by receiving an interfering signal based on data sent in the allocation target wireless area.

Furthermore, the base station 11 of the first embodiment allocates a wireless resource different from that allocated to communication of a preamble in the neighboring wireless area to data communication in the allocation target wireless area.

For the above, the wireless resource allocated to communication of a preamble in the neighboring wireless area can suppress an interfering signal that the base station 12 providing the neighboring wireless area is to receive. Consequently, it is possible to reduce the possibility that the base station 12 providing the neighboring wireless erroneously detects a preamble of random access.

Besides, the base station 11 of the first embodiment uses a range obtained by excluding a wireless resource allocated to communication of a preamble in the neighboring wireless area from the basic range as the restriction range. The basic range is a range of a wireless resource allocatable to data communication in the allocation target wireless area with the wireless terminal 21, 22, ... not being positioned in the boundary region. The restriction range is a range of a wireless resource allocatable to data communication in the allocation target wireless area with the wireless terminal 21, 22, ... positioned in the boundary region.

Data that the wireless terminal 21, 22, ... positioned in the boundary region sends is received by the base station 12 providing the neighboring wireless area, in the form of an interfering signal more intensive than data sent by the wireless terminal 21, 22, ... positioned in the allocation target wireless area except for the boundary region.

Accordingly, the base station 11 of the first embodiment can reduce the possibility that the base station 12 providing the neighboring wireless area erroneously detects a preamble of random access, efficiently using a wireless resource.

The base station 11 of the first embodiment allocates the wireless resource within the basic range to communication with the wireless terminal 21, 22, ... positioned out of the boundary region. Alternatively, the base station 11 may allocate the wireless resource of the restriction range to the communication with the wireless terminal 21, 22, ... out of the boundary region.

The base station 11 of the first embodiment may allocate a wireless resource to data communication in the allocation target wireless area with the wireless terminal 21, 22, ... positioned in the boundary region in advance of allocation of a wireless resource to the wireless terminal 21, 22, ... positioned out of the boundary area This can reduce possibility of shortage of a wireless resource allocatable to the wireless terminal 21, 22, ... positioned in the boundary region.

Second Embodiment

Next, the wireless communication system according to a second embodiment will now be described. The wireless communication system of the second embodiment is different from that of the first embodiment in the restriction range. The following description will focus on the difference.

In the wireless communication system 1 of the second embodiment, the restriction range is obtained by excluding one or more subframes the same as an element allocated to the RACH in the neighboring wireless area from the basic range.

Figure 16:
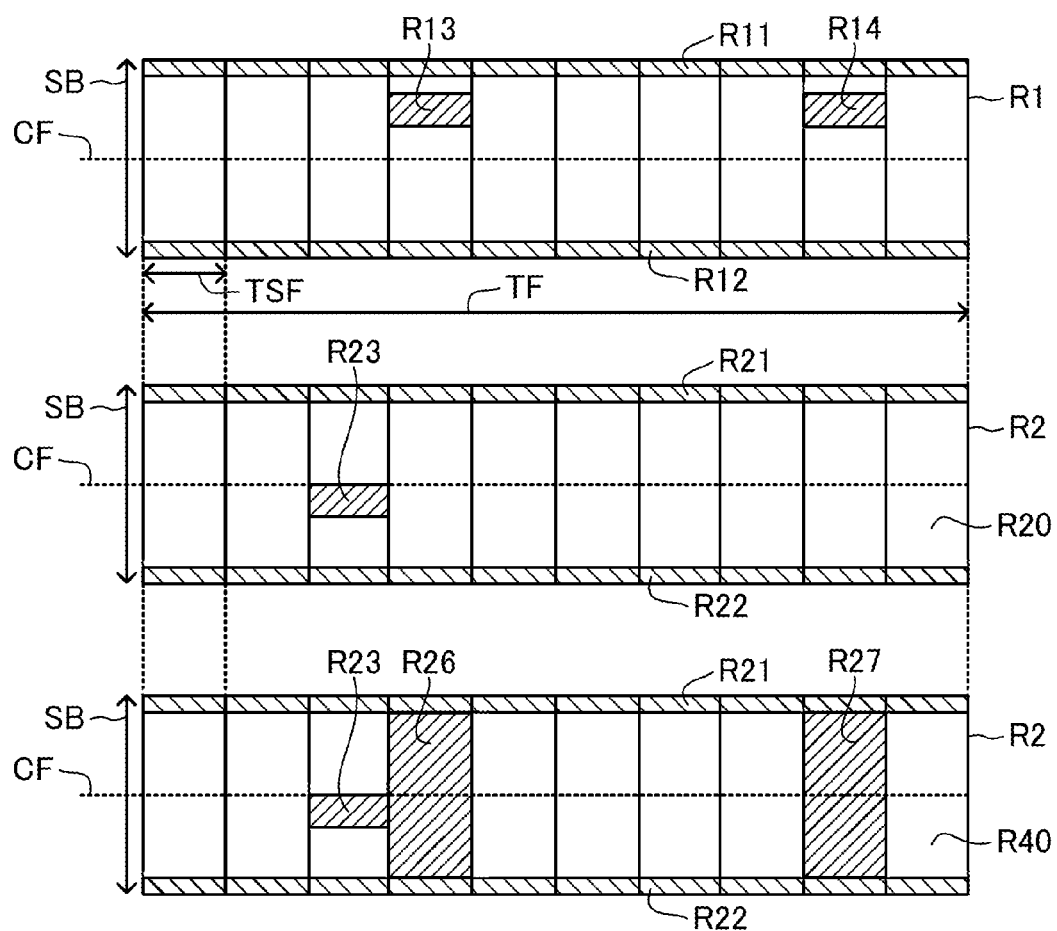
FIG. 16 is a diagram schematically depicting a basic range and a restriction range that a base station of a second embodiment uses.

Here, the restriction range is further described with reference to FIG. 16.

The restriction area R40 is the remainder of excluding a wireless resource of elements R21-R23, R26, and R27 from the frame R2 in the allocation target wireless area. The elements R21 and R22 are allocated to the PUCCH in the allocation target wireless area; the element R23 is allocated to the RACH in the allocation target wireless area; and the elements R26 and R27 are the same subframe as elements R13 and R14 allocated to the RACH in the neighboring wireless area. Accordingly, the elements R26 and R27 are wireless resources including the elements R13 and R14 allocated to the RACH in the neighboring wireless area.

Accordingly, the scheduler 120 of the second embodiment allocates a wireless resource different in time from the wireless resource allocated to the RACH in the neighboring wireless area to communication with the wireless terminal 21, 22, . . . positioned in the boundary region in the allocation target wireless area.

Accordingly, the wireless resource allocated to communication of a preamble of the neighboring wireless area further reliably suppresses an interfering signal that the base station 12 providing the neighboring wireless area is to receive.

Third Embodiment

Next, the wireless communication system according to a third embodiment will now be described. The wireless communication system of the third embodiment is different from that of the first embodiment in the restriction range. The following description will focus on the difference.

In the wireless communication system 1 of the third embodiment, the restriction range is obtained by excluding a frequency band the same as a portion allocated to the RACH in the neighboring wireless area from the basic region.

Figure 17:
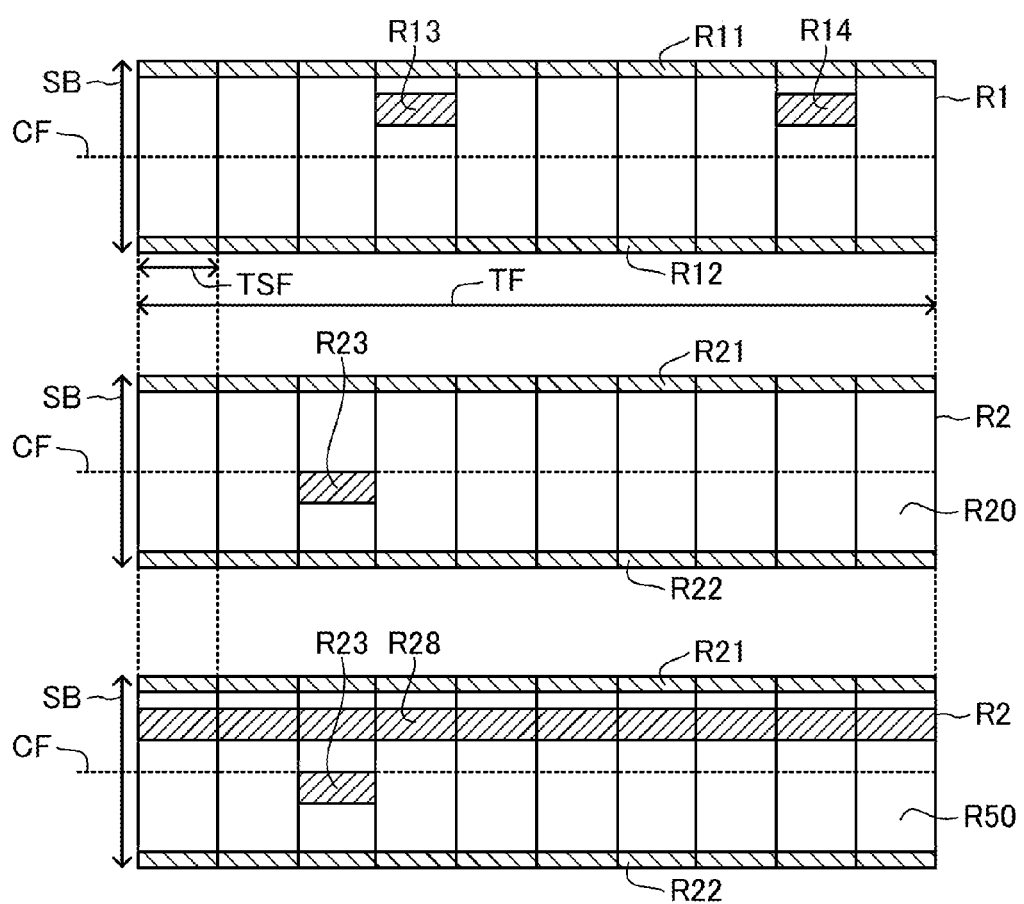
FIG. 17 is a diagram schematically depicting a basic range and a restriction range that a base station of a third embodiment uses.

Here, the restriction range is further described with reference to FIG. 17.

The restriction area R50 is the remainder of excluding a wireless resource of elements R21-R23, and R28 from the frame R2 in the allocation target wireless area. The elements R21 and R22 are allocated to the PUCCH in the allocation target wireless area; the element R23 is allocated to the RACH in the allocation target wireless area; and the element R28 is a portion having the same frequency band as the elements R13 and R14 allocated to the RACH in the neighboring wireless area. Accordingly, the element R28 is wireless resources including the elements R13 and R14 allocated to the RACH in the neighboring wireless area.

Accordingly, the scheduler 120 of the third embodiment allocates a wireless resource different in frequency from the wireless resource allocated to the RACH in the neighboring wireless area to communication in the neighboring wireless area with the wireless terminal 21, 22, . . . positioned in the boundary region in the allocation target wireless area.

Accordingly, the wireless resource allocated to communication of a preamble in the neighboring wireless area further reliably suppress an interfering signal that the base station 12 providing the neighboring wireless area is to receive.

Modification to Third Embodiment

Next, the wireless communication system according to a modification to the third embodiment will now be described. The wireless communication system of this modification is different from that of the third embodiment in carrying out carrier aggregation. The following description will focus on the difference.

The wireless communication system 1 according to this modification to the third embodiment executes Carrier Aggregation (CA) using multiple Component Carriers (CCs) to allow the base stations 11, 12, . . . to conduct wireless communication with the wireless terminals 21, 22, . . . . For example, the wireless communication system 1 conducts wireless communication in conformity with LTE-Advanced.

The multiple CCs includes a primary CC (PCC) and at least one secondary CC (SCC). The multiple CCs have respective different carrier frequencies. For example, the carrier frequency of the PCC is about 800 MHz while the carrier frequency of SCC is about 2 GHz.

In this case, the wireless communication system 1 allocates a wireless resource of the PCC to the RACH but does not allocate a wireless resource of the SCC to the RACH. Further, in the wireless communication system 1 of this modification, the basic range includes the wireless resources of both PCC and SCC. The restriction range is the remainder of excluding the wireless resource of the PCC from the basic range.

Accordingly, the scheduler 120 allocates the wireless resource of the SCC to communication in the allocation target wireless area with the wireless terminal 21, 22, . . . positioned in the boundary region while does not allocate the wireless resource of the PCC to the same communication. The SCC is an example of a CC different from a CC containing a wireless resource allocated to communication of a preamble in the neighboring wireless area.

Accordingly, the wireless resource allocated to communication of a preamble of the neighboring wireless area further reliably suppress an interfering signal that the base station 12 providing the neighboring wireless area is to receive.

Fourth Embodiment

Next, the wireless communication system according to a fourth embodiment will now be described. The wireless communication system of the fourth embodiment is different from that of the first embodiment in using a first restriction range and a second restriction range as the restriction range. The following description will focus on the difference.

In the wireless communication system 1 according to the fourth embodiment, the base station 11 selectively uses the first restriction range and the second restriction range as the restriction range. In the fourth embodiment, the second restriction range is narrower than the first restriction range. An example of the first restriction range is the restriction range R30 of FIG. 10 while an example of the second restriction range is the restriction range R40 in FIG. 16 or alternatively may be the restriction range R50 of FIG. 17.

Figure 18:
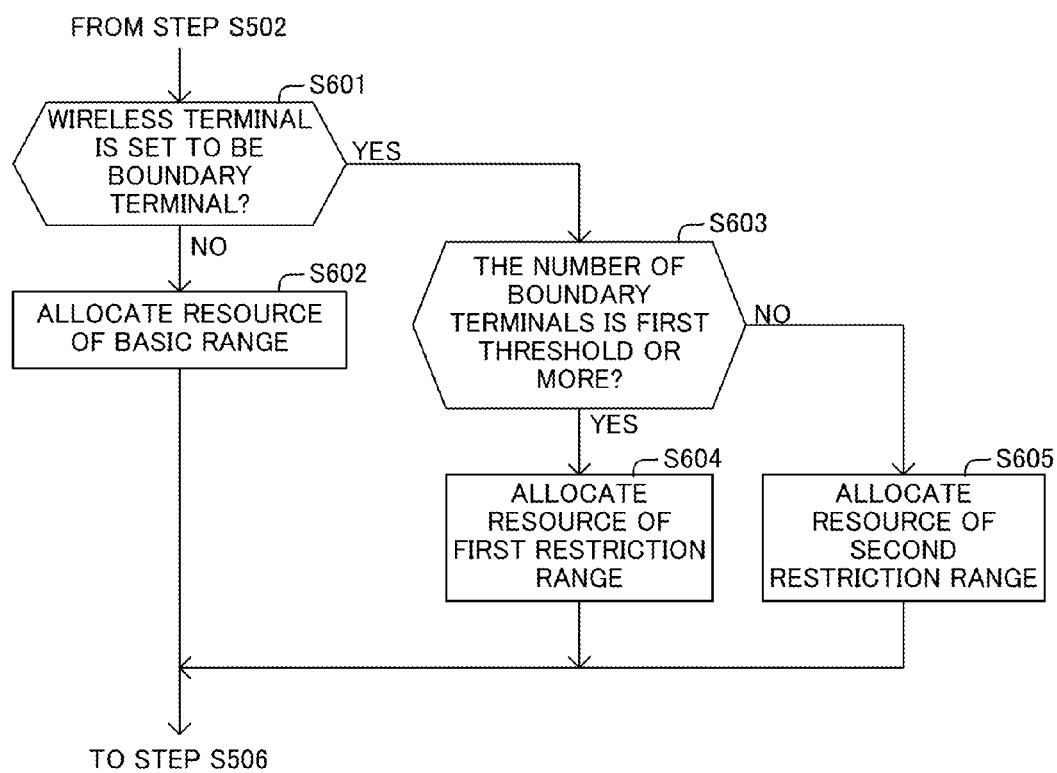
FIG. 18 is a flow diagram denoting an example of part of a succession of procedural steps of an allocating process that a base station of a fourth embodiment performs.

The base station 11 of the fourth embodiment executes an allocating process having steps S601-S605 of FIG. 18 in place of steps S503-S506 of FIG. 15.

In the fourth embodiment, the base station 11 determines whether the target wireless terminal 21, 22, . . . to be processed is set to be a boundary terminal (step S601 of FIG. 18).

In cases where the target wireless terminal is set to be a non-boundary terminal, the base station 11 determines "No" in step S601 and allocates the wireless resource of the basic range to communication in the allocation target wireless area with the target wireless terminal (step S602 of FIG. 18).

In contrast, in cases where the target wireless terminal is set to be a boundary terminal, the base station 11 determines "Yes" in step S601 and determines whether the number of wireless terminals 21, 22, . . . (i.e., the number of boundary terminals) that are set to be the boundary terminals is equal to or more than a first threshold (step S603 of FIG. 18).

In cases where the number of boundary terminals is equal to or more than the first threshold, the base station 11 determines "Yes" in step S603 and then allocates the wireless resource of the first restriction range to communication in the allocation target wireless area with the target wireless terminal 21, 22, . . . (step S604 of FIG. 18). The number of boundary terminals is less than the first threshold, the base station 11 determines "No" in step S603 and then allocates the wireless resource of the second restriction range to communication in the allocation target wireless area with the target wireless terminal 21, 22, . . . (step S605 of FIG. 18). After that, the base station 11 returns the procedure to the step S502 through step S506.

As described above, the wireless communication system 1 of the fourth embodiment can obtain the same advantages and effects as those of the wireless communication system 1 of the first embodiment.

Furthermore, the base station 11 of the fourth embodiment changes, on the basis of the number of wireless terminals 21, 22, . . . positioned in the boundary region, the range of a wireless resource allocatable to data communication in the allocation target wireless area with the wireless terminals 21, 22, . . . positioned in the boundary region.

In cases where the number of wireless terminals 21, 22, . . . positioned in the boundary region is equal to or more than the first threshold, the base station 11 according to the fourth embodiment allocates a wireless resources of the first restriction range, which is wider than the second restriction range. This can reduce the possibility of shortage of a wireless resource allocatable to the wireless terminal 21, 22, . . . positioned in the boundary region as compared with a case where a wireless resource of the second restriction range is allocated regardless of the number of wireless terminals 21, 22, . . . positioned in the boundary region.

Fifth Embodiment

Next, the wireless communication system according to a fifth embodiment will now be described. The wireless communication system of the fifth embodiment is different from that of the first embodiment in the point that allocation of a wireless resource in the allocation target wireless are is based on allocation information of multiple neighboring wireless areas. The following description will focus on the difference.

The base station 11 according to the fifth embodiment obtains allocation information representing allocation of a wireless resource used for communication of a preamble of random access in each of the multiple neighboring wireless areas.

Figure 19:
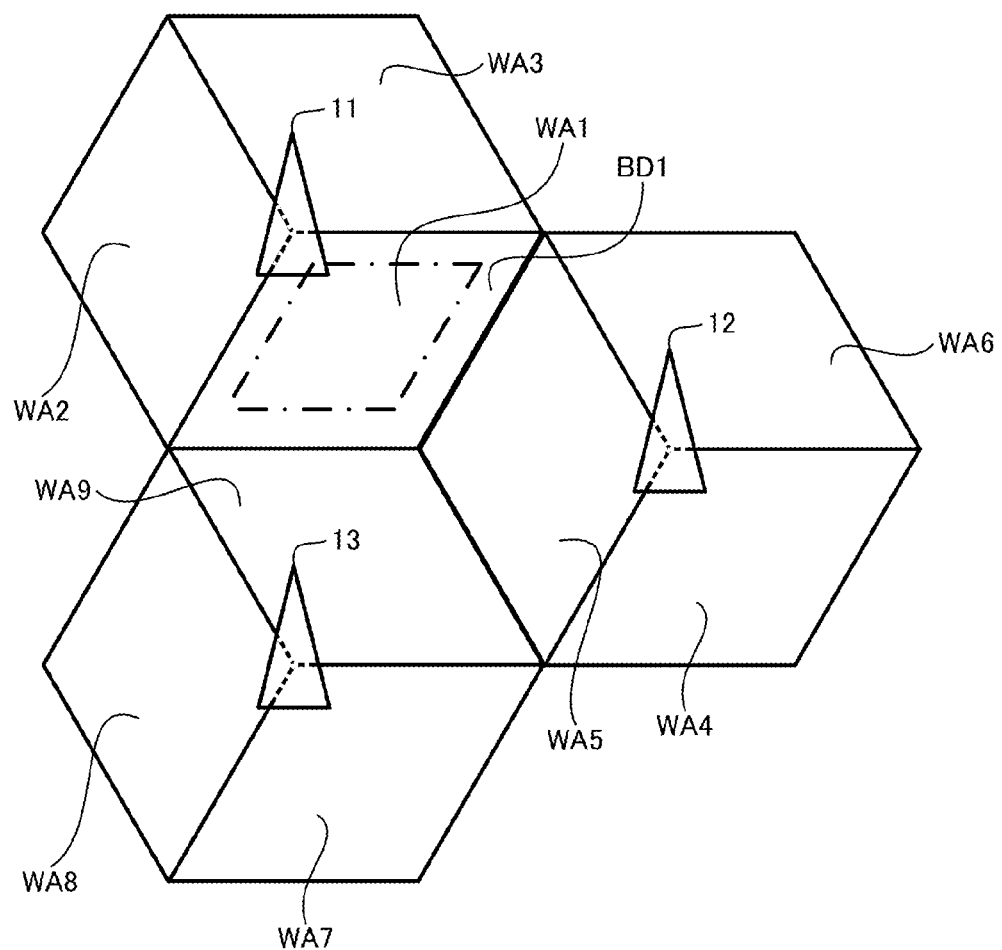
FIG. 19 is a diagram schematically illustrating an example of relationship between multiple neighboring wireless areas and a boundary region when multiple base stations provide each of the multiple neighboring wireless areas.
Figure 20:
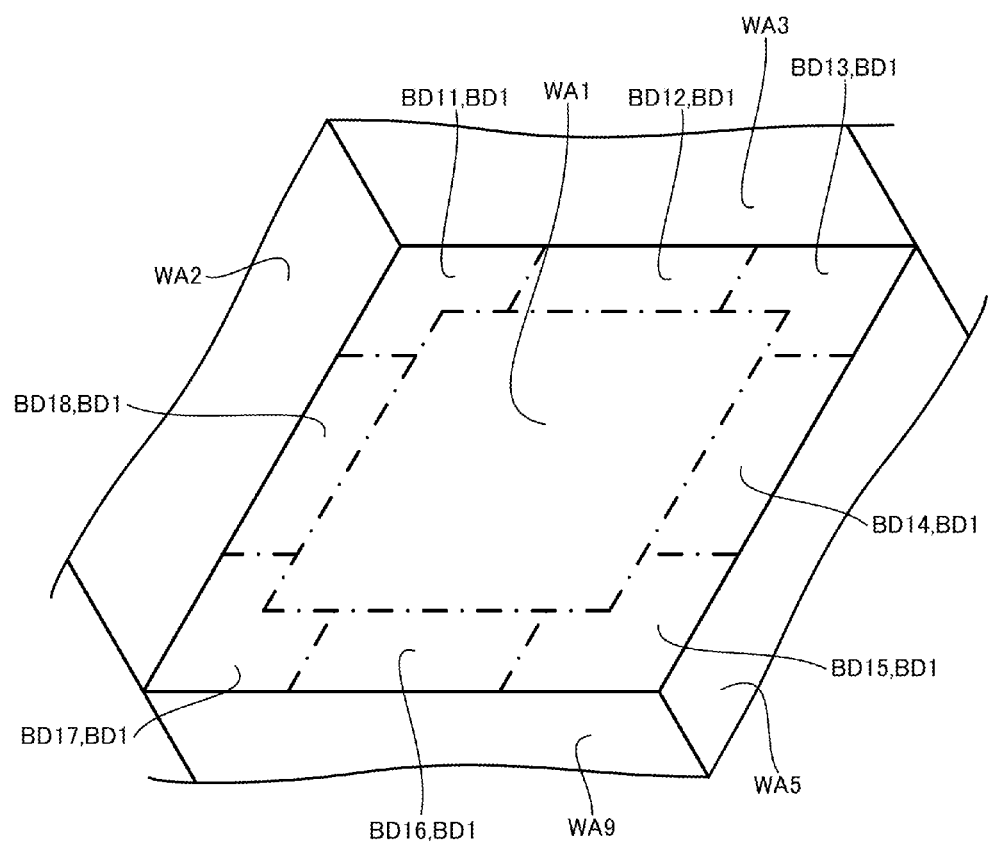
FIG. 20 is a diagram schematically illustrating an example of multiple partial boundary regions included in a boundary region of FIG. 19.

The example of FIG. 19 assumes that the base station 11 provides three wireless areas WA1, WA2, and WA3; the base station 12 provides three wireless areas WA4, WA5, and WA6; the base station 13 provides three wireless areas WA7, WA8, and WA9; and the wireless area WA1 adjoins multiple wireless areas WA2, WA3, WA5, and WA9. The wireless area WA1 is an example of the allocation target wireless area while the multiple wireless areas WA2, WA3, WA5, and WA9 are examples of the neighboring wireless areas.

In this case, the scheduler 120 obtains the allocation information of two neighboring wireless areas WA2 and WA3, the allocation information being retained by the local base station 11.

Furthermore, the scheduler 120 obtains allocation information of the neighboring wireless area WA5 by extracting the allocation information from the control information sent from the base station 12 and received in the S1/X2 interface processor 110 of the local base station 11. Likewise, the scheduler 120 obtains allocation information of the neighboring wireless area WA9 by extracting the allocation information from the control information sent from the base station 13 and received in the S1/X2 interface processor 110 of the local base station 11.

In the fifth embodiment, the boundary region BD1 is divided into multiple partial boundary regions BD11-BD18. For example, the partial boundary region BD11 adjoins two neighboring wireless areas WA2 and WA3; the partial boundary region BD13 adjoins two neighboring wireless areas WA3 and WA5; the partial boundary region BD15 adjoins two neighboring wireless areas WA5 and WA9; the partial boundary region BD17 adjoins two neighboring wireless areas WA2 and WA9; and the partial boundary regions BD12, BD14, BD16, and BD18 adjoin partial neighboring wireless areas WA3, WA5, WA9, and WA2, respectively. A partial boundary region may adjoins three or more neighboring wireless areas.

In the fifth embodiment, boundary region information includes partial boundary region information representing a partial boundary region. When determining that the position represented by the position data included in a boundary region indicated by the boundary region information, the boundary determiner 197 of FIG. 4 identifies the partial boundary region including the position. In the fifth embodiment, the result of the determining includes terminal identification information, boundary flag information, and a partial boundary region ID that specifies the above identified partial boundary region.

As illustrated in FIG. 21, the scheduler 120 stores therein a table in which a partial boundary region ID and a neighboring area ID that identifies a neighboring wireless area adjoining the partial boundary region identified by the Partial boundary region ID with each other beforehand. In the fifth embodiment, the partial boundary IDs that identify the partial boundary region BD11-BD18 are BBD#1-BBD#8, respectively. The neighboring area IDs that identifies the neighboring wireless areas WA2, WA3, WA5, and WA9 are WA#2, WA#3, WA#5, and WA#9, respectively.

In the fifth embodiment, the scheduler 120 determines the first restriction range and the second restriction range for each boundary region on the basis of the obtained allocation information and the above table.

The first restriction range is the remainder of excluding the portion allocated to the RACH in each neighboring wireless area adjoining the partial boundary area from the basic range.

The second restriction range is the remainder of excluding one or more subframes the same as the portion allocated to the RACH in each neighboring wireless area adjoining the partial boundary area from the basic range.

Here, description will now be made in relation to the first restriction range and the second restriction range with reference to FIGS. 22 and 23. For example, the description focuses on the first restriction range and the second restriction range set for the partial boundary region BD13. In this case, the allocation target wireless area is the wireless area WA1 and the multiple neighboring wireless areas are the wireless areas WA3 and WA5 respectively regarded as the first and second neighboring areas.

The frame R1 includes elements R11 and R12 allocated to the PUCCH in the first neighboring wireless area and elements R13 and R14 allocated to the RACH in the first neighboring wireless area.

The frame R9 includes elements R91 and R92 allocated to the PUCCH in the second neighboring wireless area and element R93 allocated to the RACH in the second neighboring wireless area.

Figure 22:
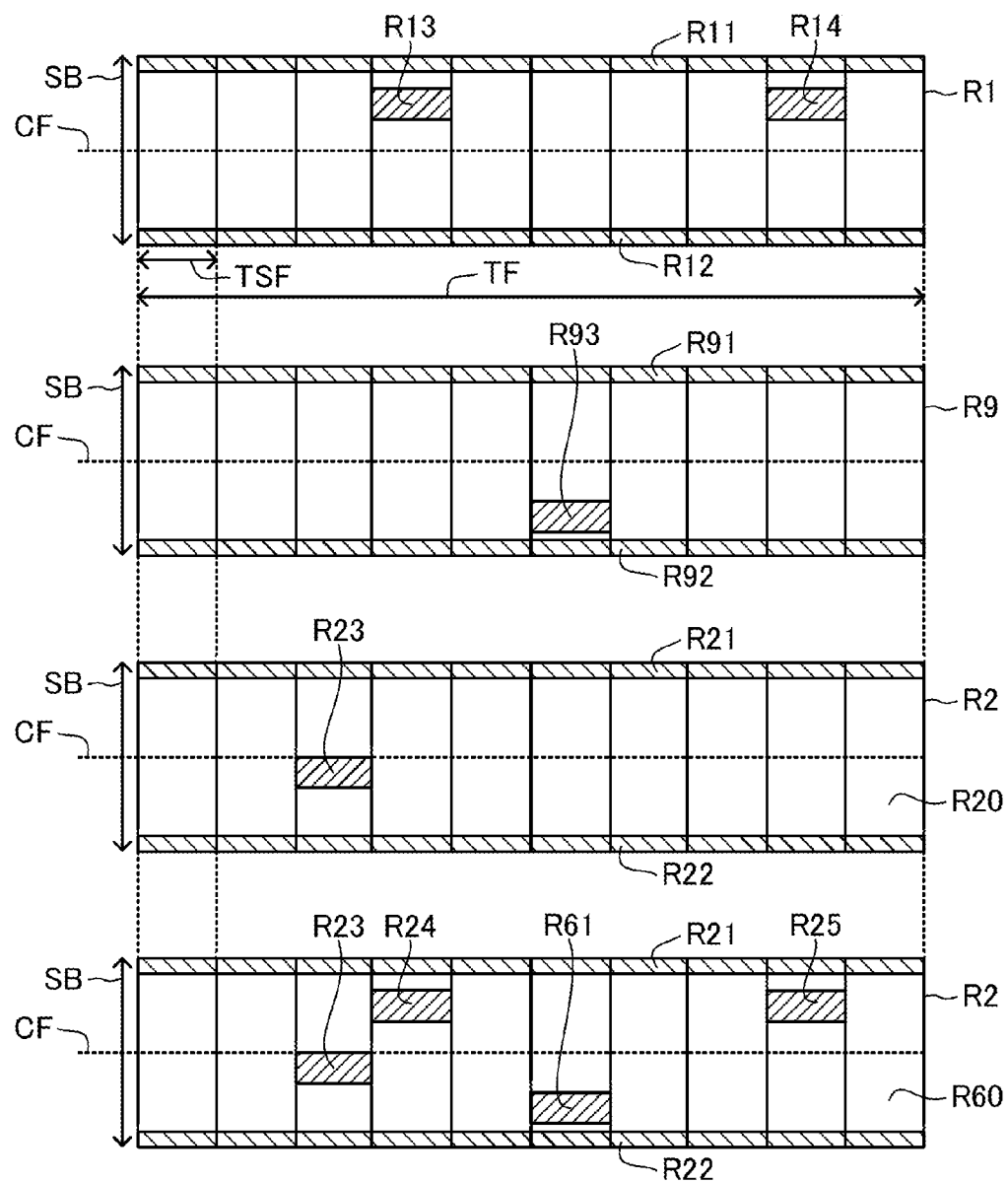
FIG. 22 is a diagram schematically illustrating an example of a first restriction range that a base station of the fifth embodiment uses.

As illustrated in FIG. 22, the first restriction range R60 is the remainder of excluding wireless resource elements R21-R25 and R61 from the frame R2 of the allocation target wireless area. The elements R21 and R22 are allocated to the PUCCH in the allocation target wireless area while the element R23 is allocated to the RACH in the allocation target wireless area. The elements R24 and R25 are allocated to the RACH in the first neighboring wireless area and the element R61 is allocated to the RACH in the second neighboring wireless area. Accordingly, the elements R24, R25, and R61 are the same wireless resources as the elements R13, R14, and R93 allocated to the RACHs in the respective neighboring wireless areas.

Figure 23:
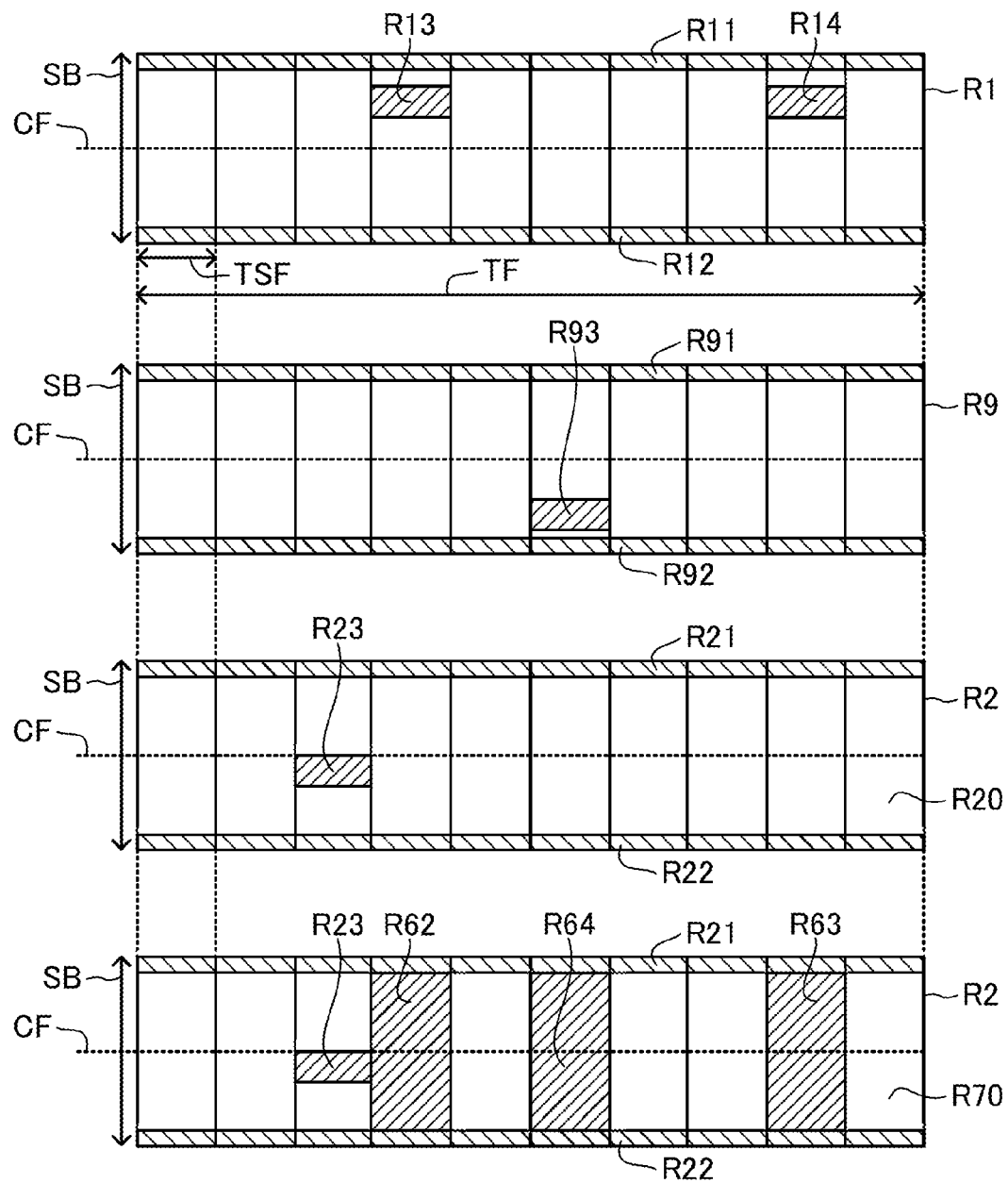
FIG. 23 is a diagram schematically illustrating an example of a second restriction range that a base station of the fifth embodiment uses.

As illustrated in FIG. 23, the second restriction range R70 is the remainder of excluding wireless resource elements R21-R23 and R62-R64 from the frame R2 of the allocation target wireless area. The elements R21 and R22 are allocated to the PUCCH in the allocation target wireless area while the element R23 is allocated to the RACH in the allocation target wireless area. The elements R62 and R63 are the same subframe as the elements R13 and R14 allocated to the RACH in the first neighboring wireless area and the element R64 is the same subframe as the elements R93 allocated to the RACH in the second neighboring wireless area. Accordingly, the elements R62-R64 are the wireless resources including the elements R13, R14, and R93 allocated to the RACHs in the respective neighboring wireless areas.

The second restriction range may be the remainder of excluding a element having the same frequency band as that of the element allocated to each neighboring wireless area adjoining the partial boundary region from the basic range.

Figure 24:
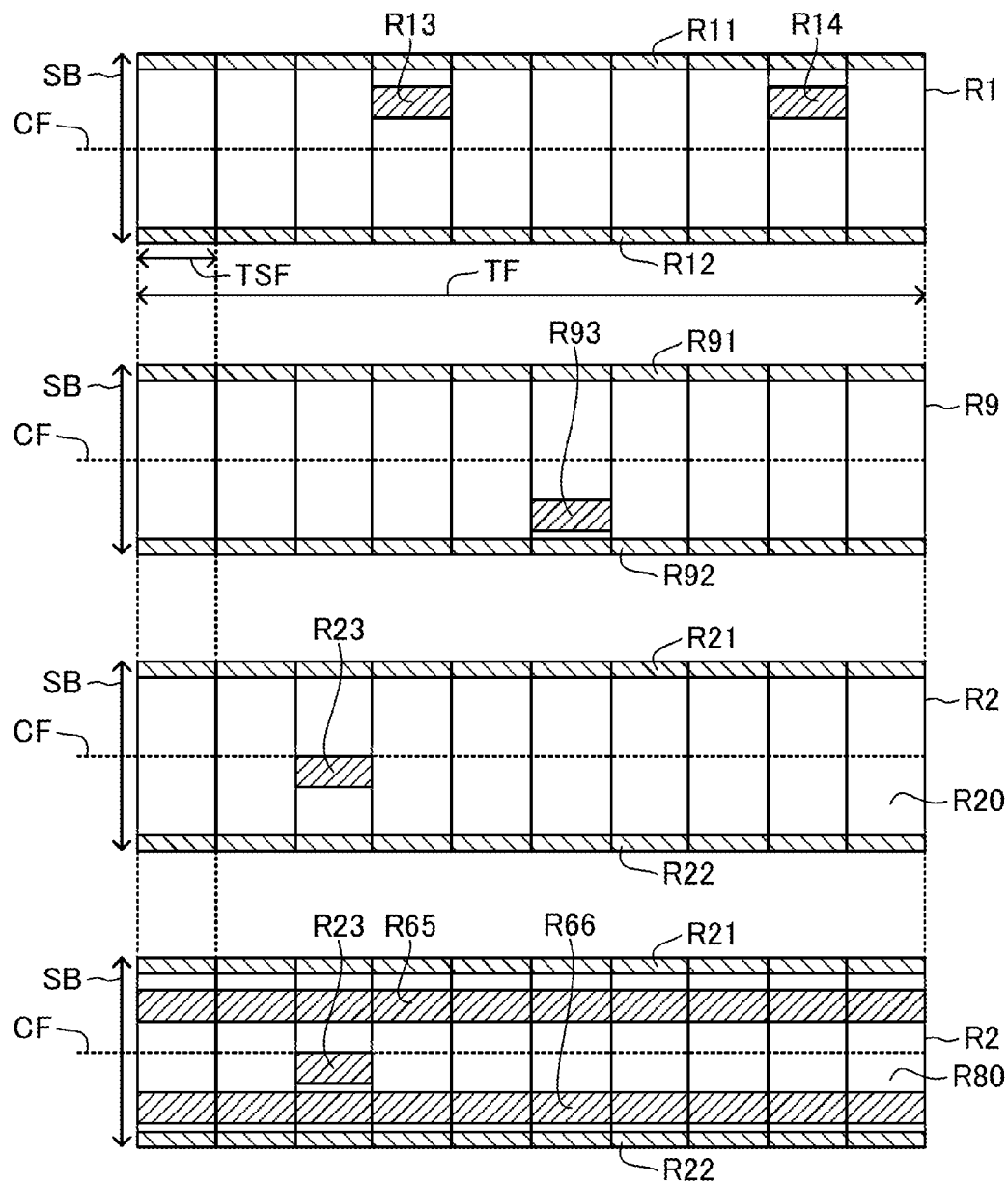
FIG. 24 is a diagram schematically illustrating a modification to a second restriction range that a base station of the fifth embodiment uses.

As illustrated in FIG. 24, the second restriction range R80 is the remainder of excluding wireless resource elements R21-R23 and R65, R66 from the frame R2 of the allocation target wireless area. The elements R21 and R22 are allocated to the PUCCH in the allocation target wireless area while the element R23 is allocated to the RACH in the allocation target wireless area. The element R65 has the same frequency band as that of the elements R13 and R14 allocated to the RACH in the first neighboring wireless area and the element R66 has the same frequency band as that the element R93 allocated to the RACH in the second neighboring wireless area. Accordingly, the elements R65 and R66 are the wireless resources including the elements R13, R14, and R93 allocated to the RACHs in the respective neighboring wireless areas.

The scheduler 120 stores therein a first restriction range and a second restriction range determined for each partial boundary region in association with the partial boundary region.

In cases where the result of determining of the boundary determiner 197 indicates that the wireless terminal 21, 22, . . . is positioned inside the boundary region, the scheduler 120 obtains the number of neighboring areas on the basis of the result of the determining and the contents of the above table. The number of neighboring areas is the number of neighboring wireless areas adjoining the partial boundary area including the position of the wireless terminal.

In cases where the obtained number of neighboring areas is equal to or more than a second threshold, the scheduler 120 allocates the wireless resource of the first restriction range associated with the partial boundary region including the above position of the wireless terminal to communication with the wireless terminal. In contrast, in cases where the obtained number of neighboring areas is less than a second threshold, the scheduler 120 allocates the wireless resource of the second restriction range associated with the partial boundary region including the above position of the wireless terminal to communication with the wireless terminal.

Figure 25:
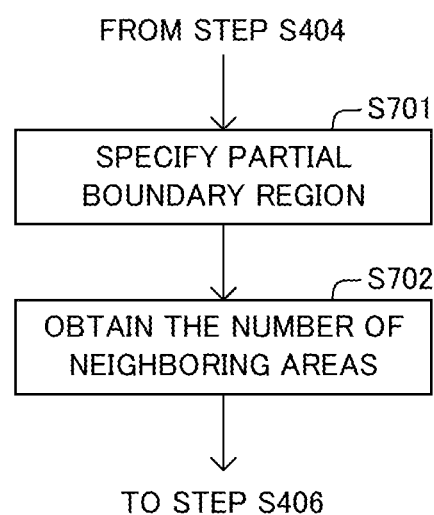
FIG. 25 is a flow diagram denoting an example of part of a succession of procedural steps of a boundary determining process that a base station of the fifth embodiment performs.

In place of the boundary determining process of FIG. 14, the base station 11 of the fifth embodiment executes a boundary determining process that additionally have steps S701 and S702 of FIG. 25 between steps S404 and S406 of FIG. 14. Alternatively, step S404 is carried out after step S702.

After setting the target wireless terminal 21, 22, . . . to be a boundary terminal (step S404 of FIG. 14), the base station 11 identifies the partial boundary region including the position of the wireless terminal (step S701 of FIG. 25). Next, the base station 11 obtains the number of neighboring wireless areas (neighboring areas) adjoining the identified partial boundary region (step S702 of FIG. 25). Then the base station 11 returns the procedure to step S401 via step S406.

Figure 26:
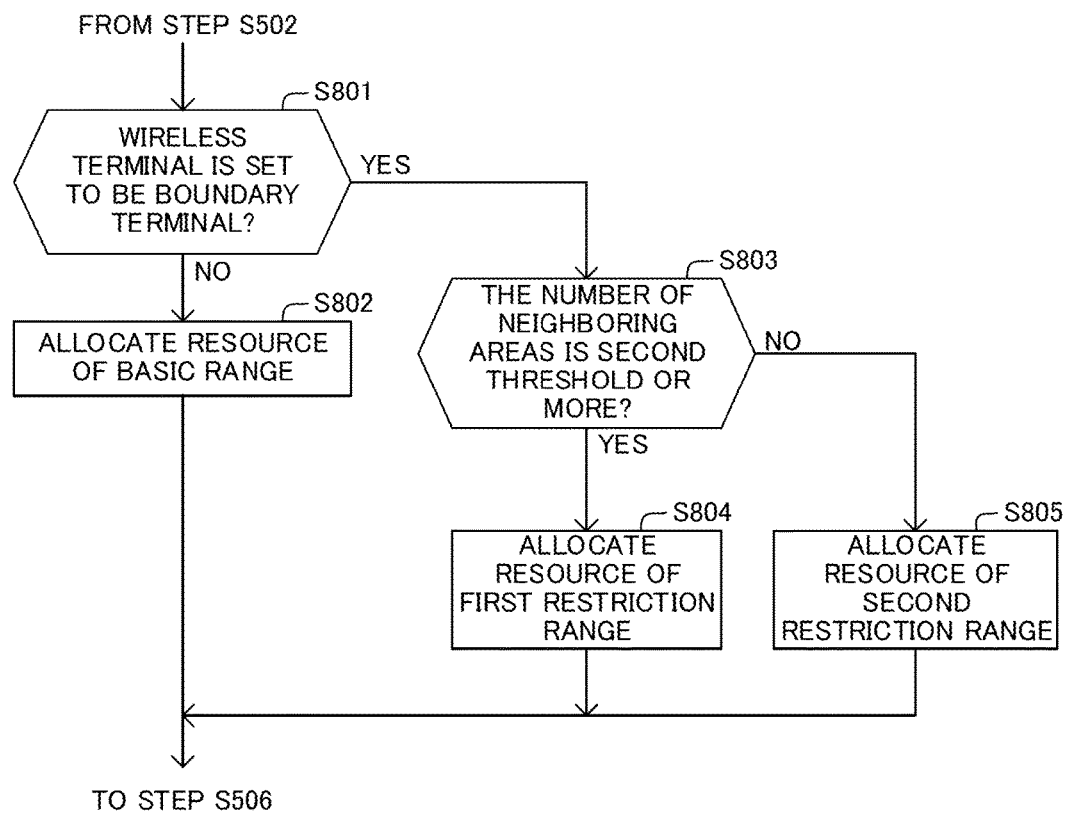
FIG. 26 is a flow diagram denoting an example of part of a succession of procedural steps of an allocating process that a base station of the fifth embodiment performs.

In place of the allocating process of FIG. 15, the base station 11 of the fifth embodiment carries out the allocating process having steps S801-S805 of FIG. 26 replaced for steps S503-S505 of FIG. 15.

In the fifth embodiment, the base station 11 determines whether the target wireless terminal 21, 22, . . . is set to be a boundary terminal (step S801 of FIG. 26).

In cases where the target wireless terminal 21, 22, . . . is set to be a non-boundary terminal, the base station 11 determines "No" in step S801 and allocates the wireless resource of the basic range to communication in the allocation target wireless area with the wireless terminal 21, 22, . . . (step S802 of FIG. 26).

In contrast, in cases where the target wireless terminal 21, 22, . . . is set to be a boundary terminal, the base station 11 determines "Yes" in step S801 and further determines the number of neighboring areas obtained for the wireless terminal set to be the boundary terminal is equal to or more than the second threshold (step S803 of FIG. 26).

In cases where the number of neighboring areas is equal to or more than the second threshold, the base station 11 determines "Yes" in step S803 and allocates the wireless resource of the first restriction range to communication with the target wireless terminal in the allocation target wireless area (step S804 of FIG. 26). At this time, the base station 11 uses the first range associated with the partial boundary region identified in relation to the target wireless terminal.

In cases where the number of neighboring areas is less than the second threshold, the base station 11 determines "No" in step S803 and allocates the wireless resources of the second restricted range to communication with the target wireless terminal 21, 22, . . . in the allocation target wireless area (step S805 in FIG. 26). At this time, the base station 11 uses the second range associated with the partial boundary region identified in relation to the target wireless terminal.

Then, the base station 11 returns the procedure to step S502 via step S506.

As described above, the wireless communication system 1 of the fifth embodiment can obtain the same advantages and effects as those of the wireless communication system 1 of the first embodiment.

Furthermore, the base station 11 of the fifth embodiment obtains the allocation information for each of multiple neighboring wireless areas. The base station 11 further allocates a wireless resource different from a wireless resource allocated to communication of the preamble in each of the multiples neighboring wireless areas to data communication in the allocation target wireless area.

This can reduce the possibility that, even if the allocation target wireless area adjoins multiple wireless areas, the neighboring wireless areas erroneously detects preambles of random access.

In addition, the base station 11 of the fifth embodiment uses the range of excluding the wireless resource allocated to communication of preambles in multiple neighboring wireless areas from the basic range as the restriction range (in the fifth embodiment, the first restriction range and the second restriction range). The basic range corresponds to a range of a wireless resource allocatable to data communication in the allocation target wireless area with the wireless terminal 21, 22, . . . not being positioned in the boundary region. The restriction range corresponds to a range of a wireless resource allocatable to data communication in the allocation target wireless area with the wireless terminal 21, 22, . . . positioned in the boundary region.

The data sent from the wireless terminal 21, . . . positioned in the boundary region is received, as an interfering signal more intensive than data sent from the wireless terminal 21, . . . positioned out of the boundary area, by the base stations 11, 12, . . . providing neighboring wireless areas.

Accordingly, the base station 11 of the fifth embodiment efficiently uses the wireless resource, and also reduces the possibility that the base stations 11, 12, . . . providing neighboring wireless areas erroneously detect preambles of random access.

Furthermore, the base station 11 of the fifth embodiment changes the range of a wireless resource allocatable to data communication in the allocation target wireless area with the wireless terminal 21, 22, . . . positioned in the boundary region, on the basis of the number of neighboring wireless areas.

Increase in the number of neighboring wireless areas adjoining the allocation target wireless area narrows the range of a wireless resource allocatable to the wireless terminal 21, 22, . . . positioned in the boundary region.

Here, when the number of neighboring wireless area is equal to or more than the second threshold, the base station 11 of the fifth embodiment allocates a wireless resource of the first restriction range wider than the second restriction range to data communication in the allocation target wireless area. This can reduce the possibility of shortage of a wireless resources allocatable to the wireless terminal 21, 22, . . . positioned in the boundary region as compared with a case where a wireless resource of the second restriction range is allocated regardless of the number of neighboring wireless area.

The base station 11 of the fifth embodiment selectively uses the first restriction range or the second restriction range in accordance with the number of neighboring wireless areas. Alternatively, the base station 11 may use one of the first and second restriction ranges irrespective of the number of neighboring wireless areas. This allows the base station 11 to omit the process of obtaining the number of wireless areas.

Alternatively, even when multiple neighboring wireless exist, the base station 11 of the fifth embodiment may be configured not to set partial boundary region. In this case, the base station 11 may use a range of excluding a wireless resource allocated to communication of preambles in all the neighboring wireless area from the basic area as the restriction area.

The base station 11 of the fifth embodiment may change the range of a wireless resource allocatable to data communication in the allocation target wireless area with the wireless terminal 21, 22, . . . positioned in the boundary area on the basis of the number of wireless terminals 21, 22, . . . in the boundary area.

In the foregoing embodiments, the base station 11 controls allocation of a wireless resources to uplink data communication on the basis of the allocation information, but alternatively may control allocation of a wireless resource to downlink data communication.

In the foregoing embodiments, the base station 11 controls allocation of a wireless resource to the first wireless area on the basis of the allocation information of the second wireless area adjoining the first wireless area. Alternatively, the base station 11 may control allocation of a wireless resource to the first wireless area on the basis of the allocation information of the second wireless area at least partially overlapping the first wireless area.

Further alternatively, the base station 11 may control allocation of a wireless resource to the first wireless area on the basis of the second area which may include the first wireless area, may be included in the first area, or may be separated from the first wireless area.

The foregoing embodiments can reduce the possibility that a base station erroneously detect a preamble of random access.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A base station that provides a first wireless area to communicate with a wireless terminal using a wireless resource, the base station comprising:
   an antenna with which the base station provides the first wireless area; and
   a controller that obtains a first wireless resource and a second wireless resource, when controlling allocation of the first wireless resource to be used for data communication between the base station and the wireless terminal in the first wireless area, refers to allocation information representing allocation of the second wireless resource to be used for communication of a preamble of random access in a second wireless area, wherein a wireless resource allocatable to data communication in the first wireless area with a wireless terminal positioned in a boundary region between the first wireless area and the second wireless area is obtained by excluding at least the second wireless resource from a wireless resource allocatable to data communication in the first wireless area with a wireless terminal not being positioned in the boundary region.

2. The base station according to claim 1, wherein the controller allocates the first wireless resource different from the second wireless resource to the data communication in the first wireless area.

3. The base station according to claim 2, wherein the controller allocates the first wireless resource different in frequency from the second wireless resource to the data communication in the first wireless area.

4. The base station according to claim 3, wherein:
the base station communicates with the wireless terminal through carrier aggregation (CA) using a plurality of component carriers (CC); and
the controller allocates the first wireless resource contained in a CC different from a CC containing the second wireless resource to the data communication in the first wireless area.

5. The base station according to claim 2, wherein the controller allocates the first wireless resource different in time from the second wireless resource to the data communication in the first wireless area.

6. The base station according to claim 1, wherein the controller allocates a wireless resource to the data communication in the first wireless area with the wireless terminal positioned in the boundary region in preference to allocation to the data communication in the first wireless area with the wireless terminal not being positioned in the boundary area.

7. The base station according to claim 1, wherein the controller changes a wireless resource allocatable to the data communication in the first wireless area with the wireless terminal positioned in the boundary area on the basis of the number of wireless terminals positioned in the boundary region.

8. The base station according to claim 1, further comprising an obtainer that obtains allocation information representing allocation of a wireless resource to be used for communication of a preamble of random access in each of a plurality of wireless areas including the second wireless area but not including the first wireless area, wherein the controller allocates the first wireless resource not allocated to the communication of the preamble in the plurality of wireless areas to the data communication in the first wireless area.

9. The base station according to claim 8, wherein a wireless resource allocatable to data communication in the first wireless area with a wireless terminal positioned in a boundary region between the first wireless area and at least one of the plurality of wireless areas is obtained by excluding at least a wireless resource allocated to communication of the preamble in the at least one wireless area from a wireless resource allocatable to data communication in the first wireless area with a wireless terminal not being positioned in the boundary region.

10. The base station according to claim 9, wherein the controller changes the wireless resource allocatable to the data communication in the first wireless area with the wireless terminal positioned in the boundary area on the basis of the number of the at least one wireless area.

11. A wireless communication system comprising:
a wireless terminal; and
a base station that provides a first wireless area to communicate with the wireless terminal using a wireless resource, that comprises an antenna with which the base station provides the first wireless area, and that comprises a controller that obtains a first wireless resource and a second wireless resource, when controlling allocation of the first wireless resource to be used for data communication between the base station and the wireless terminal in the first wireless area, refers to allocation information representing allocation of the second wireless resource to be used for communication of a preamble of random access in a second wireless area,
the wireless terminal comprising a communication controller that executes the data communication using the first wireless resource allocated, in response to sending the preamble of random access to the base station in the first wireless area, by the base station referring to the allocation information, wherein a wireless resource allocatable to data communication in the first wireless area with a wireless terminal positioned in a boundary region between the first wireless area and the second wireless area is obtained by excluding at least the second wireless resource from a wireless resource allocatable to data communication in the first wireless area with a wireless terminal not being positioned in the boundary region.

12. The wireless communication system according to claim 11, wherein the controller allocates the first wireless resource different from the second wireless resource to the data communication in the first wireless area.

13. A method for allocating a wireless resource in a base station that provides a first wireless area to communicate with a wireless terminal using a wireless resource, the method comprising:
obtaining a first wireless resource and a second wireless resource;
when controlling allocation of the first wireless resource to be used for data communication between the base station and the wireless terminal in the first wireless area, referring to allocation information representing allocation of the second wireless resource to be used for communication of a preamble of random access in a second wireless area, wherein a wireless resource allocatable to data communication in the first wireless area with a wireless terminal positioned in a boundary region between the first wireless area and the second wireless area is obtained by excluding at least the second wireless resource from a wireless resource allocatable to data communication in the first wireless area with a wireless terminal not being positioned in the boundary region.

14. The method according to claim 13, wherein
allocating the first wireless resource different from the second wireless resource to the data communication in the first wireless area.

* * * * *